US011327466B2

(12) United States Patent
Nishino et al.

(10) Patent No.: US 11,327,466 B2
(45) Date of Patent: May 10, 2022

(54) COMMAND-VALUE GENERATION APPARATUS

(71) Applicant: Mitsubishi Electric Corporation, Chiyoda-ku (JP)

(72) Inventors: Shinya Nishino, Tokyo (JP); Seiji Uozumi, Tokyo (JP); Takeshi Tsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 242 days.

(21) Appl. No.: 16/319,585

(22) PCT Filed: Feb. 16, 2017

(86) PCT No.: PCT/JP2017/005770
§ 371 (c)(1),
(2) Date: Jan. 22, 2019

(87) PCT Pub. No.: WO2018/042704
PCT Pub. Date: Mar. 8, 2018

(65) Prior Publication Data
US 2020/0183359 A1    Jun. 11, 2020

(30) Foreign Application Priority Data

Sep. 2, 2016 (JP) ............................. JP2016172161

(51) Int. Cl.
*G05B 19/4103* (2006.01)
*G05B 19/4093* (2006.01)
*G05B 17/02* (2006.01)

(52) U.S. Cl.
CPC ......... *G05B 19/4103* (2013.01); *G05B 17/02* (2013.01); *G05B 19/4093* (2013.01)

(58) Field of Classification Search
CPC . G05B 19/4103; G05B 17/02; G05B 19/4093
(Continued)

(56) References Cited

U.S. PATENT DOCUMENTS 6,643,560 B2    11/2003   Shimomura
8,805,562 B2    8/2014    Matsubara et al.
(Continued)

FOREIGN PATENT DOCUMENTS

JP      2014-522529 A       9/2014
WO      WO 01/75538 A1      10/2001
WO      WO 2011/004420 A1   1/2011

OTHER PUBLICATIONS

International Search Report dated May 9, 2017, in PCT/JP2017/005770, filed Feb. 16, 2017.

*Primary Examiner* — Kenneth M Lo
*Assistant Examiner* — Mohammed Shafayet
(74) *Attorney, Agent, or Firm* — Xsensus LLP

(57) ABSTRACT

A command-value generation apparatus includes: a segmentation unit to segment a machining program into execution units to generate segment machining programs; a parallel computation unit, including a plurality of arithmetic units, to execute the segment machining programs on a per execution unit basis in parallel and generate a segment command for each of the execution units, the segment command being a group of interpolation points on the tool path; and a command-value generation unit to generate a tool travel command from the segment command for each of the execution units. The segment machining programs are separate from one another by at least one segmentation point. The segment machining programs includes a forward segment machining program located forward of the segmentation point, and a rearward segment machining program located rearward of the segmentation point.

11 Claims, 26 Drawing Sheets

(58) Field of Classification Search
USPC .......................................................... 700/189
See application file for complete search history.

(56) References Cited

U.S. PATENT DOCUMENTS

| | | | |
|---|---|---|---|
| 9,836,039 B2 | 12/2017 | Pruschek et al. | |
| 2003/0033049 A1* | 2/2003 | Shimomura | G05B 19/40932 |
| | | | 700/187 |
| 2012/0296462 A1* | 11/2012 | Otsuki | G05B 19/4069 |
| | | | 700/104 |
| 2013/0054182 A1* | 2/2013 | Tezuka | G05B 19/408 |
| | | | 702/141 |
| 2014/0195037 A1* | 7/2014 | Nishibashi | G05B 19/4103 |
| | | | 700/188 |
| 2015/0309498 A1* | 10/2015 | Aizawa | G05B 19/19 |
| | | | 318/570 |
| 2017/0300029 A1* | 10/2017 | Oda | G05B 19/4093 |

\* cited by examiner

FIG.14

```
N100  G90      ⎤
N102  G43H1    ⎬ ADDED
N103  G1F3000  ⎦
       .
       .
       . (SEGMENTATION
       .    POINT 1)
       .
N200  G43H2
N201  G1F5000
N202  XxYyZz
       .
       .
       .
       . (SEGMENTATION
       .    POINT 2)
       .
```

FIG.15

```
N100  G90      ⎤
N200  G43H2    ⎬ ADDED
N201  G1F5000  ⎦
       .
       .
       . (SEGMENTATION
       .    POINT 2)
       .
       .
```

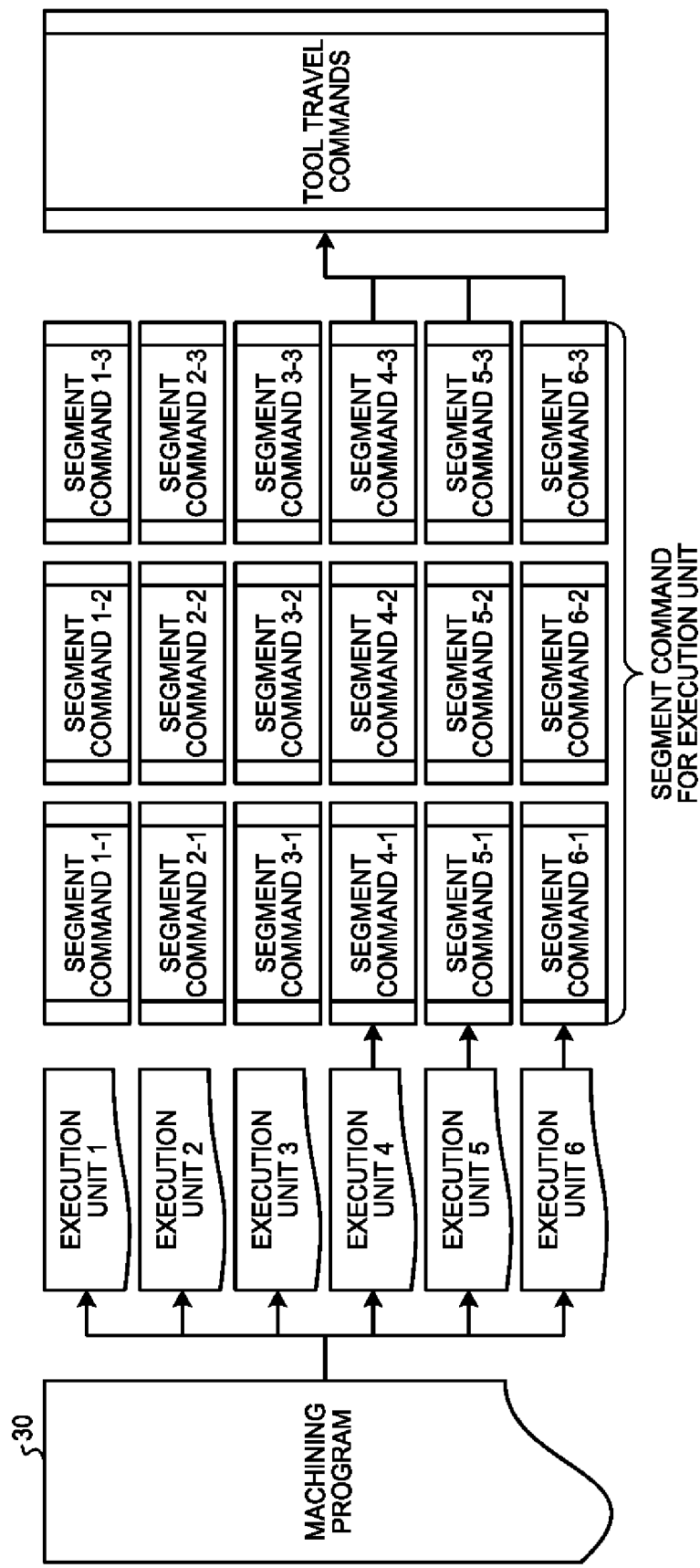

COMMAND-VALUE GENERATION APPARATUS

FIELD

The present invention relates to a command-value generation apparatus including a plurality of arithmetic units operable in parallel to thereby generate a tool travel command.

BACKGROUND

When workpieces are machined using machine tools, it is conventionally a general practice to generate machining programs by using computer aided manufacturing (CAM). The machining program describes information on a machined workpiece shape, the feed rate of a tool, and the number of revolutions of the tool. A command-value generation apparatus reads the machining program and makes correction, such as coordinate transformation, tool length correction, tool diameter correction, and machine error correction, to thereby compute a tool path. The command-value generation apparatus further performs other types of processing, such as acceleration/deceleration, and computes an interpolation point, which is a command point on a tool path per unit time. As used herein, a command point on a tool path per unit time is referred to as "an interpolation point", and a series of interpolation points is referred to as "a tool travel command". A numerical control (NC) apparatus is used as a command-value generation apparatus in many cases. A machining program generated for a machined workpiece shape having a free-form surface provides plural short continuous line segments that approximate to the free-form surface. The lengths of the line segments need to be shortened in order to express the free-form surface as accurately as possible; thus, when a machining program is generated, the lengths of the line segments in the machining program tend to be short. Shortened lengths of line segments in a machining program increase the number of line segments to be processed by the command-value generation apparatus, thus increasing the time taken to generate tool travel commands. This problem is particularly notable in die machining involving free-form surfaces and five-axis machining entailing coordinate transformation.

To provide solutions to the problem, methods have been developed to generate tool travel commands swiftly by causing a plurality of arithmetic units to compute the tool travel commands in parallel. A technique disclosed in Patent Literature 1, which is an example conventional technique, segments a machining program on a per machining-process basis and uses a plurality of processor cores to compute tool travel commands in parallel.

CITATION LIST

Patent Literature

Patent Literature 1: Japanese Translation of PCT International Application Laid-open No. 2014-522529

SUMMARY

Technical Problem

Unfortunately, the conventional technique described above, which can segment a machining program only at points where the machining operation is suspended temporarily, fails to distribute the throughput evenly among the arithmetic units. This technique is thus problematic in that tool travel commands cannot be generated swiftly by using the processing performance of the arithmetic units.

The present invention has been achieved in view of the above, and an object of the present invention is to provide a command-value generation apparatus that generates a tool travel command more swiftly than a conventional apparatus by using a plurality of arithmetic units.

Solution to Problem

To solve the above problem and achieve the object, the present invention provides A command-value generation apparatus to calculate a tool path in accordance with a machining program, and generate a tool travel command that is a group of interpolation points each located per unit time on the tool path, the apparatus comprising: a segmentation unit to segment the machining program into execution units to generate segment machining programs; a parallel computation unit, including a plurality of arithmetic units, to execute the segment machining programs on a per execution unit basis in parallel and generate a segment command for each of the execution units, the segment command being a group of interpolation points on the tool path; and a command-value generation unit to generate a tool travel command from the segment command for each of the execution units, wherein when a direction from a start of the machining program toward an end of the machining program is defined as a rearward direction and a direction from the end of the machining program toward the start of the machining program is defined as a forward direction, the segment machining programs are separate from one another by at least one segmentation point, the segment machining programs including a forward segment machining program located forward of the segmentation point, and a rearward segment machining program located rearward of the segmentation point, the forward segment machining program having an end portion, the rearward segment machining program having a start portion, the segmentation unit calculates: an acceleration distance by which a tool travels until the tool reaches a command speed on a basis of preset acceleration; and an overlap quantity at the segmentation point such that the overlap quantity is equal to or greater than the acceleration distance, and the segmentation unit causes the start portion of the rearward segment machining program and the end portion of the forward segment machining program to overlap each other by the overlap quantity.

Advantageous Effects of Invention

The present invention produces an effect of enabling swifter generation of a tool travel command than a conventional apparatus by using a plurality of arithmetic units.

BRIEF DESCRIPTION OF DRAWINGS

FIG. 14 is a diagram illustrating a segment machining program 2, in which machining-mode related commands are added, in the first embodiment.

FIG. 15 is a diagram illustrating a segment machining program 3, in which machining-mode related commands are added, in the first embodiment.

FIG. 38 is a second diagram illustrating a data flow in the command-value generation apparatus illustrated in FIG. 34 in the third embodiment.

DESCRIPTION OF EMBODIMENTS

Exemplary embodiments of a command-value generation apparatus according to the present invention are described in detail below with reference to the drawings. The present invention is not limited to the embodiments.

First Embodiment

Figure 1:
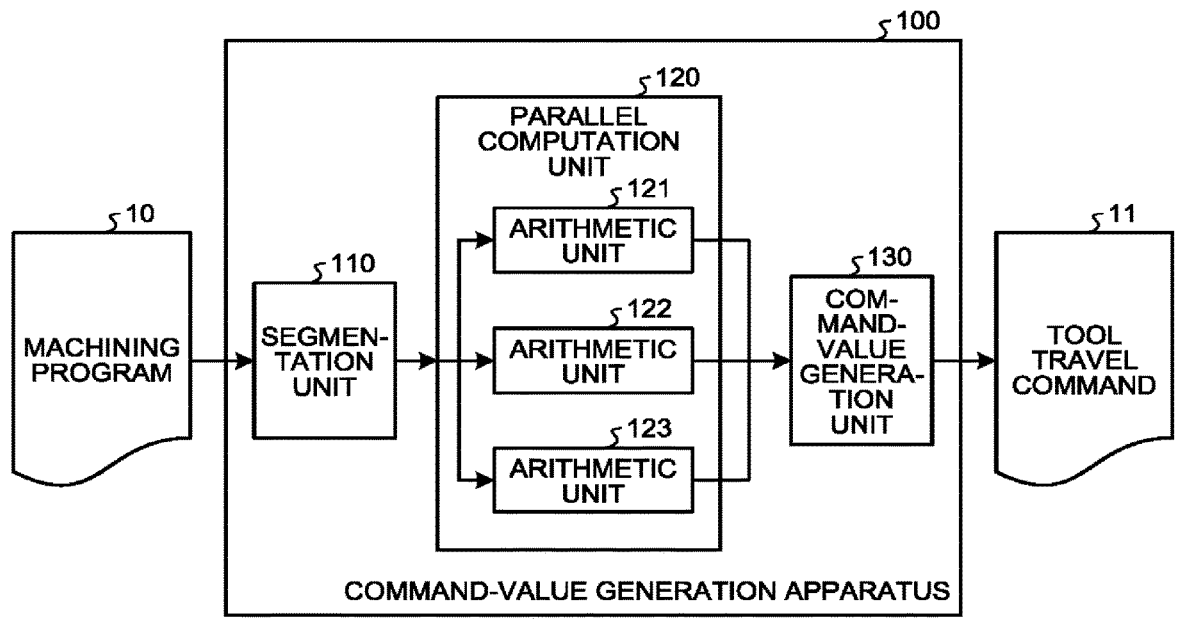
FIG. 1 is a diagram illustrating a configuration of a command-value generation apparatus according to a first embodiment.

FIG. 1 is a diagram illustrating a configuration of a command-value generation apparatus according to a first embodiment of the present invention. A command-value generation apparatus 100 illustrated in FIG. 1 is a numerical control apparatus that controls an NC machine tool (not illustrated). The command-value generation apparatus 100 illustrated in FIG. 1 numerically controls travel of a tool of the NC machine tool with respect to a workpiece by outputting a tool travel command 11 in accordance with a machining program 10 that is input thereto. The tool travel command 11 is a group of interpolation points each located per unit time on a tool path.

The command-value generation apparatus 100 includes a segmentation unit 110, a parallel computation unit 120, and a command-value generation unit 130. The segmentation unit 110 segments the machining program 10 into execution units to generate segment machining programs. The parallel computation unit 120 generates a segment command in accordance with the machining program for each execution unit. The segment command is a tool travel command for each execution unit. The command-value generation unit 130 generates a series of tool travel commands 11 from segment commands.

The parallel computation unit 120 includes an arithmetic unit 121, an arithmetic unit 122, and an arithmetic unit 123. The parallel computation unit 120 is configured by using a multi-core central processing unit (CPU), a personal computer that includes a plurality of CPUs, or a server or cloud system that is connected to a communication line. Examples of the communication line can include a local area network and the Internet. While the parallel computation unit 120 includes three arithmetic units in FIG. 1, this is not a limitation in the present invention; it is only required that the parallel computation unit 120 include at least one arithmetic unit. The greater number of arithmetic units included in the parallel computation unit 120 increases the speed with which the tool travel commands 11 are generated; thus, the number of arithmetic units may be determined in accordance with a target value for speed enhancement.

The segmentation unit 110 segments the input machining program 10 into the execution units and outputs, to the parallel computation unit 120, a segment machining program for each execution unit.

The parallel computation unit 120 assigns the segment machining programs to the arithmetic units 121, 122, and 123 on a per execution unit basis. The arithmetic unit 121, the arithmetic unit 122, and the arithmetic unit 123 each perform processing such as acceleration/deceleration and coordinate transformation, sequentially generate the segment commands for output to the command-value generation unit 130. The segment command is the tool travel command for each execution unit. The arithmetic unit 121, the arithmetic unit 122, and the arithmetic unit 123 are operated in parallel; when completing generating a segment command for one execution unit, each of the arithmetic units starts generating a segment command for a subsequent execution unit, and this process is repeated until no unprocessed execution unit is present.

The command-value generation unit 130 generates the series of tool travel commands 11 from the segment commands for the respective execution units and outputs the generated tool travel commands. The command-value generation unit 130 is configured by using a single CPU, a personal computer that includes a single CPU, or a server or cloud system that is connected to a communication line. Alternatively, the command-value generation unit 130 may be configured by using a multi-core CPU, a personal computer that includes a plurality of CPUs, or a server or cloud system that is connected to a communication line, as with the parallel computation unit 120.

Figure 2:
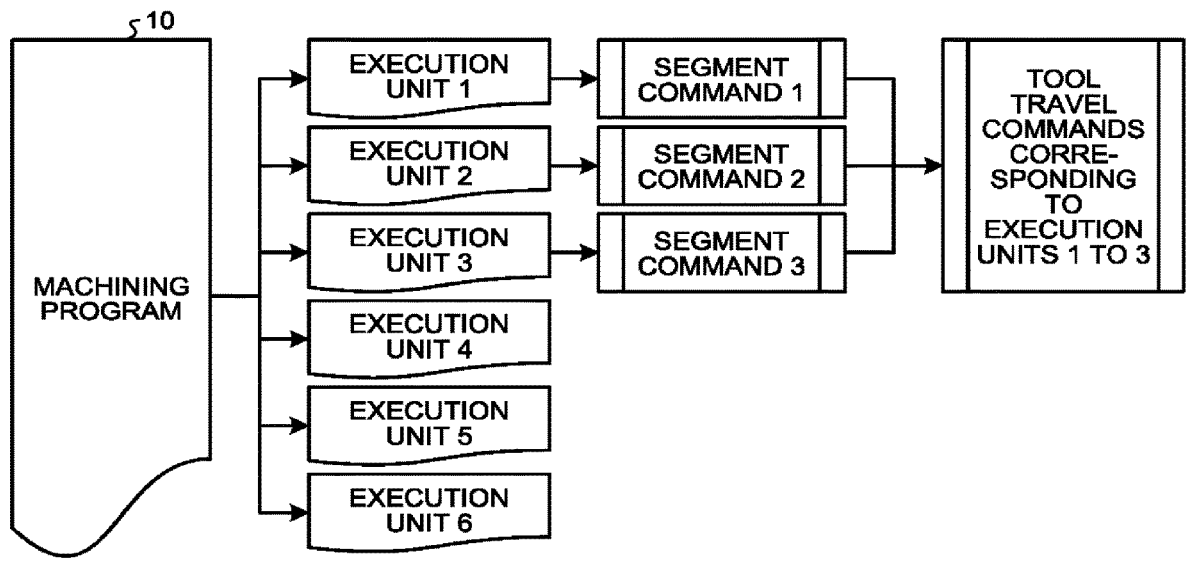
FIG. 2 is a first diagram illustrating a data flow in the command-value generation apparatus illustrated in FIG. 1 in the first embodiment.

A sequence in which parallel computation is performed is described in detail next. FIG. 2 is a first diagram illustrating a data flow in the command-value generation apparatus 100 illustrated in FIG. 1 in the first embodiment. FIG. 2 illustrates a data flow exhibited during the initial execution by the parallel computation unit 120.

Figure 3:
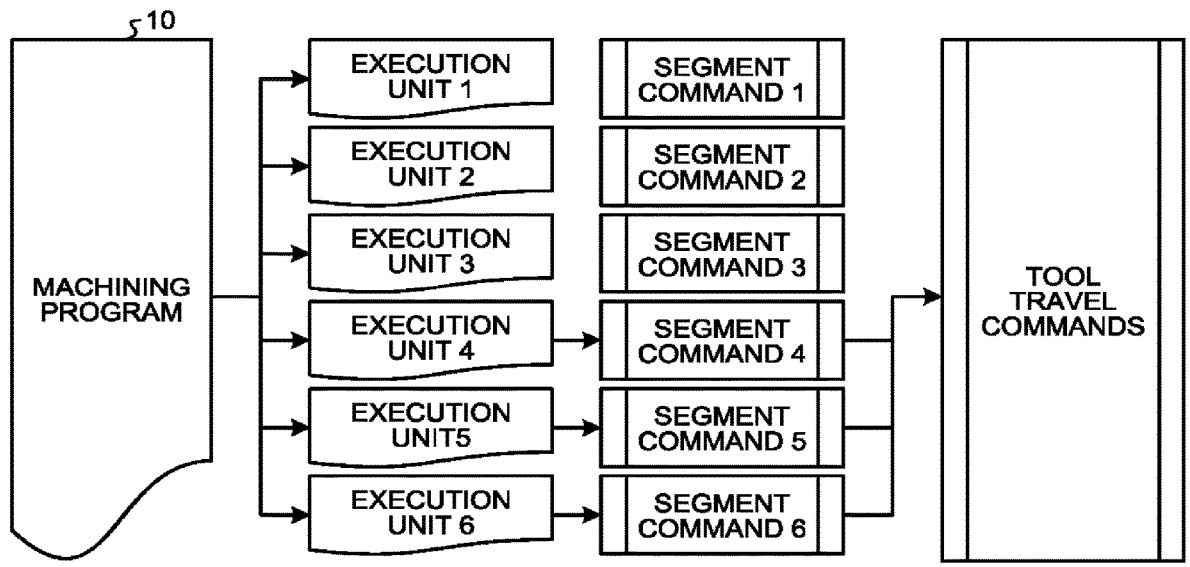
FIG. 3 is a second diagram illustrating a data flow in the command-value generation apparatus illustrated in FIG. 1 in the first embodiment.

FIG. 3 is a second diagram illustrating a data flow in the command-value generation apparatus 100 illustrated in FIG. 1 in the first embodiment. FIG. 3 illustrates a data flow exhibited when, after the initial execution is completed by the parallel computation unit 120, machining programs for the subsequent execution units are executed. While the segmentation unit 110 segments the machining program 10 into six execution units: execution unit 1; execution unit 2; execution unit 3; execution unit 4; execution unit 5; and execution unit 6 in FIGS. 2 and 3, this is not a limitation in the present invention; the number of segments can be set to any number as appropriate.

When the segmentation unit 110 segments the machining program 10 into execution unit 1, execution unit 2, execution unit 3, execution unit 4, execution unit 5, and execution unit 6 as illustrated in FIG. 2, the parallel computation unit 120, which includes the three arithmetic units, executes execution unit 1, execution unit 2, and execution unit 3 in parallel and generates a segment command 1, a segment command 2, and a segment command 3. The command-value generation unit 130 then generates, from the segment command 1, the segment command 2, and the segment command 3, tool travel commands that correspond to execution unit 1, execution unit 2, and execution unit 3.

Upon completing executing execution units 1 to 3, the parallel computation unit 120 executes execution units 4 to 6, which are the subsequent execution units, and generates segment commands 4 to 6 as illustrated in FIG. 3. The command-value generation unit 130 generates tool travel commands that correspond to execution units 4 to 6, and combines the resultant tool travel commands with those that correspond to execution units 1 to 3 to generate the tool travel commands 11, and output the same.

If there are unexecuted execution units, the process is repeated similarly until no unexecuted execution unit is present. The segment command 1 is a segment command generated when execution unit 1 is executed; the same goes for the segment commands 2, 3, 4, 5, and 6.

Figure 4:
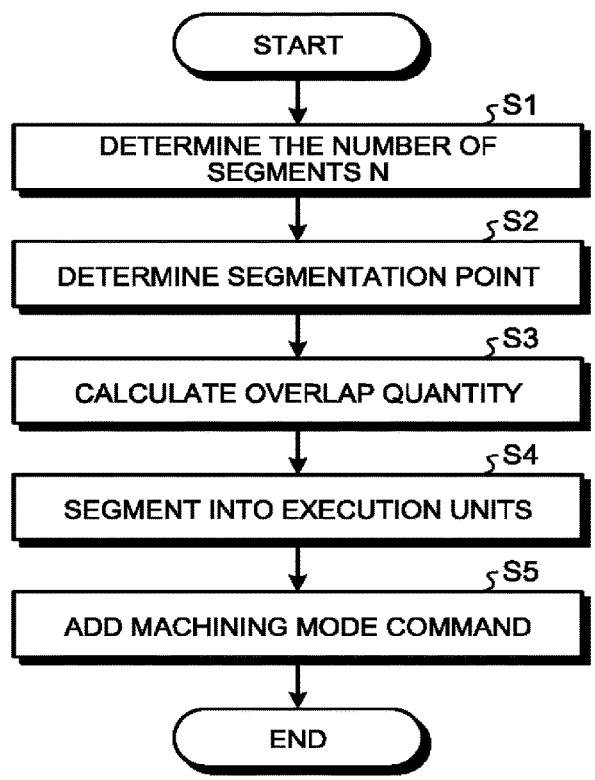
FIG. 4 is a diagram illustrating a processing flow of a segmentation unit illustrated in FIG. 1 in the first embodiment.

Processing of each of the constituent elements is described in detail next. FIG. 4 is a diagram illustrating a processing flow of the segmentation unit 110 illustrated in FIG. 1 in the first embodiment. The segmentation unit 110 starts its processing and determines the number of segments N (S1). While the number of segments N is equal to or greater than the number of arithmetic units of the parallel computation unit 120 in this embodiment, the number of segments N may be less than the number of arithmetic units if the number of lines of the machining program is small. The number of segments N is, by wat of example, six in the first embodiment.

The segmentation unit 110 then determines segmentation points at which the machining program 10 is segmented (S2). When the machining program 10 is segmented into N execution units, a computation time taken by the parallel computation unit 120 for each execution unit is as even as possible. A computation time $T(i)$ per block of the machining program 10 is obtained by dividing a length $L(i)$ of the block by a command speed $F(i)$. A computation time T for the entire machining program 10 is expressed by the total sum of the computation time T(i) per block for all the blocks, as indicated by expression (1) described below.

[Formula 1]

$$T = \sum_{i=1}^{M} T(i) = \sum_{i=1}^{M} \left(\frac{L(i)}{F(i)}\right) \quad (1)$$

M in expression (1) above represents the number of blocks of the machining program 10, that is, the number of lines of the machining program 10. The segmentation points are selected so that T/N, the computation time per execution unit is as even as possible. Segmentation points do not agree with the end points of blocks of a machining program in many cases. Segmentation points do not need to agree with the end points of blocks; thus, points resulting from the calculation of expression (1) above may be the segmentation points, or alternatively, end points of blocks that are closest to respective points resulting from the calculation of expression (1) above may be the segmentation points.

While expression (1) above shows that the computation time T(i) per block is calculated using the length L(i) of the block and the command speed F(i), the computation time T(i), which reflects effects of acceleration/deceleration and clamp speed, may be calculated further using machine allowable acceleration set as a parameter, thereby determining the segmentation points. Alternatively, the segmentation points may be points that segment the machining program 10 into execution units each providing a length obtained by dividing the total sum L of the lengths of all the blocks by the number of segments N such that a path length per execution unit is as even as possible.

Figure 5:
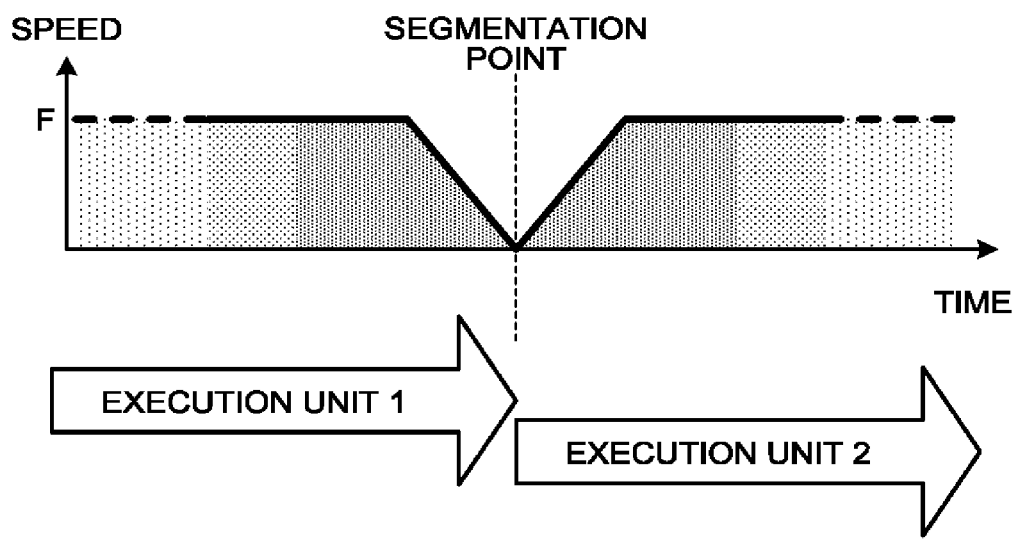
FIG. 5 is a diagram with a horizontal axis representing time and a vertical axis representing speed, illustrating behaviors exhibited before and after a segmentation point between execution unit 1 and execution unit 2 when no overlap is provided in the first embodiment.
Figure 6:
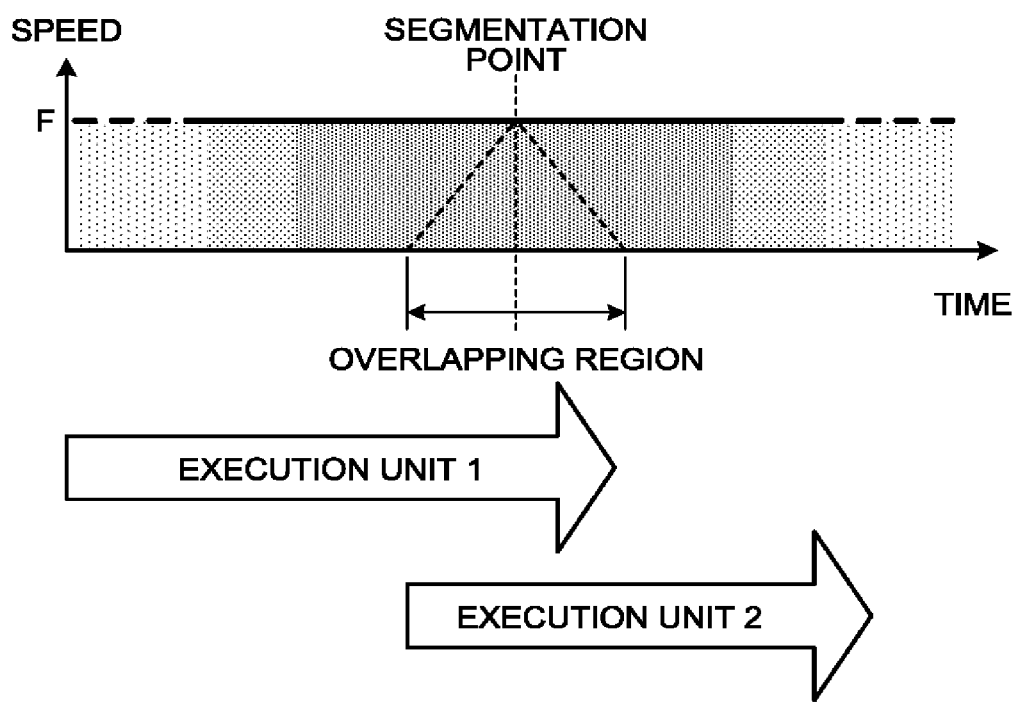
FIG. 6 is a diagram with the horizontal axis representing time and the vertical axis representing speed, illustrating behaviors exhibited before and after the segmentation point between execution unit 1 and execution unit 2 with the execution units 1 and 2 overlapping.

The segmentation unit 110 then calculates an overlap quantity Lo provided when the segmentation unit 110 segments the machining program 10 into the execution units (S3). FIG. 5 is a diagram with a horizontal axis representing time and a vertical axis representing speed, illustrating behaviors exhibited before and after a segmentation point between execution unit 1 and execution unit 2 without execution units 1 and 2 overlapping in the first embodiment. As illustrated in FIG. 5, the speed decreases to zero at the segmentation point. For this reason, when the machining program is segmented, the tool travel commands provide a path different from a path provided by tool travel commands when the machining program is not segmented. FIG. 6 is a diagram with the horizontal axis representing time and the vertical axis representing speed, illustrating behaviors exhibited before and after the segmentation point between execution unit 1 and execution unit 2 with execution units 1 and 2 overlapping in the first embodiment. The segmentation unit 110 segments the machining program into the segment units such that the execution units overlap as illustrated in FIG. 6, thereby eliminating deceleration at the segmentation point and thus generating the tool travel commands identical with those generated when the machining program is not segmented. The overlap quantity Lo is equal to or greater than an acceleration distance La: a distance by which the tool travels as the tool accelerates from zero to the command speed F.

Figure 7:
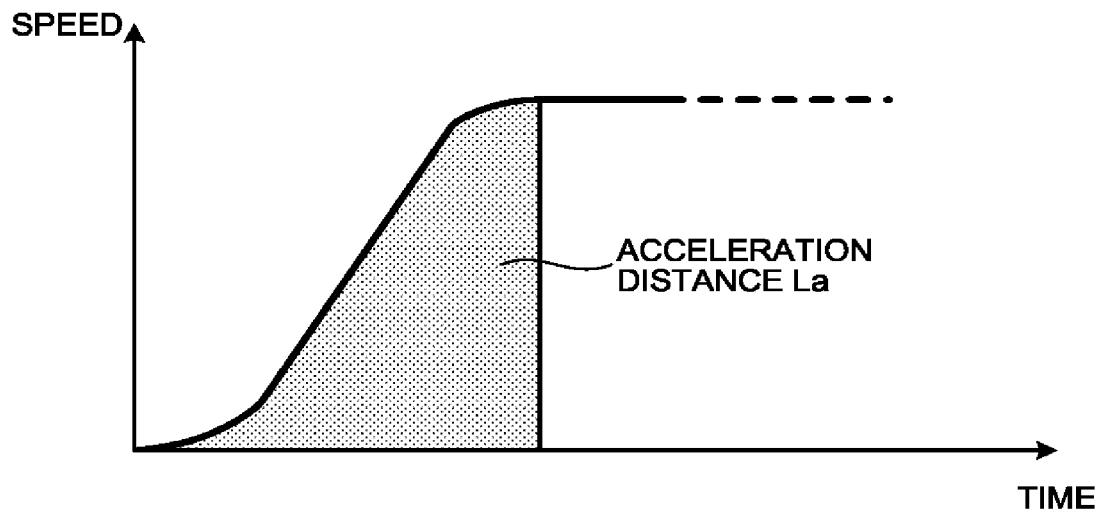
FIG. 7 is a diagram with the horizontal axis representing time and the vertical axis representing speed, illustrating an acceleration distance La in the first embodiment.
Figure 8:
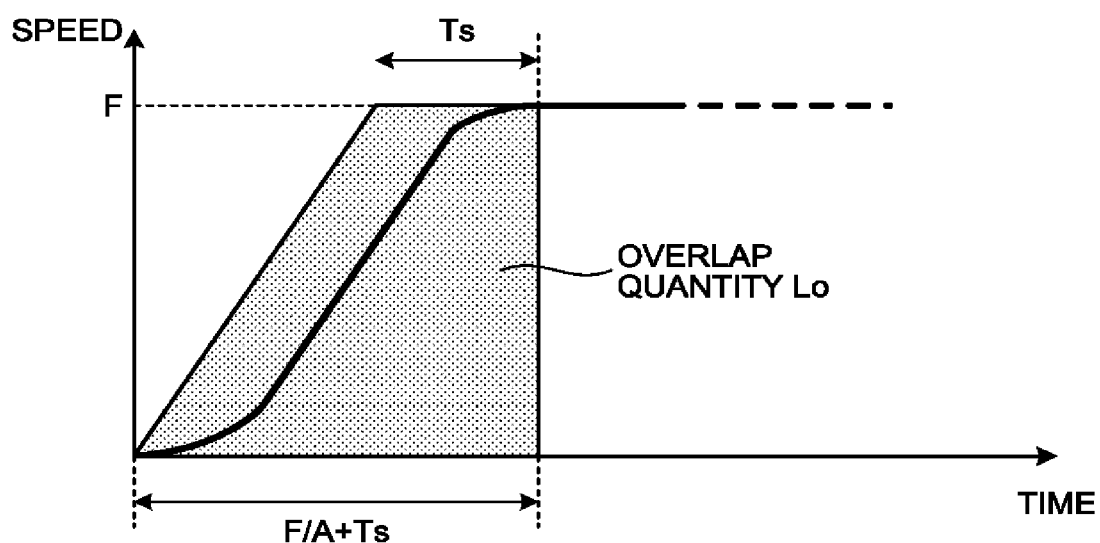
FIG. 8 is a diagram with the horizontal axis representing time and the vertical axis representing speed, illustrating an overlap quantity Lo in the first embodiment.

FIG. 7 is a diagram with the horizontal axis representing time and the vertical axis representing speed, illustrating the acceleration distance La in the first embodiment. FIG. 8 is a diagram with the horizontal axis representing time and the vertical axis representing speed, illustrating the overlap quantity Lo in the first embodiment. In FIGS. 7 and 8, when the speed waveform, which provides the speed increasing to the command speed F at an acceleration A and smooths due to a travel average filter having a time constant Ts, is generated, the acceleration distance La is a distance by which the tool travels from time zero to time (F/A+Ts). As illustrated in FIG. 8, the overlap quantity Lo, which is equal to or greater than the acceleration distance La necessary for the acceleration, is defined as a distance by which the tool travels accelerating to the command speed F at the acceleration A and then travels at the command speed F for a time of the travel average filter time constant Ts. That is, the overlap quantity Lo is represented by the area of a trapezoid illustrated in FIG. 8 and can be calculated using below expression (2) where Ts is The length of the upper side of this trapezoid, (F/A+Ts) is the length of the lower side, and F is the height.

[Formula 2]

$$Lo = \frac{F}{2}\left(\frac{F}{A} + 2Ts\right) \quad (2)$$

The segmentation unit 110 then segments (S4) the machining program 10 into the execution units at the segmentation points determined in S2. When the machining program 10 is segmented, specifically, the execution units overlap by the overlap quantity Lo calculated in S3.

Figure 9:
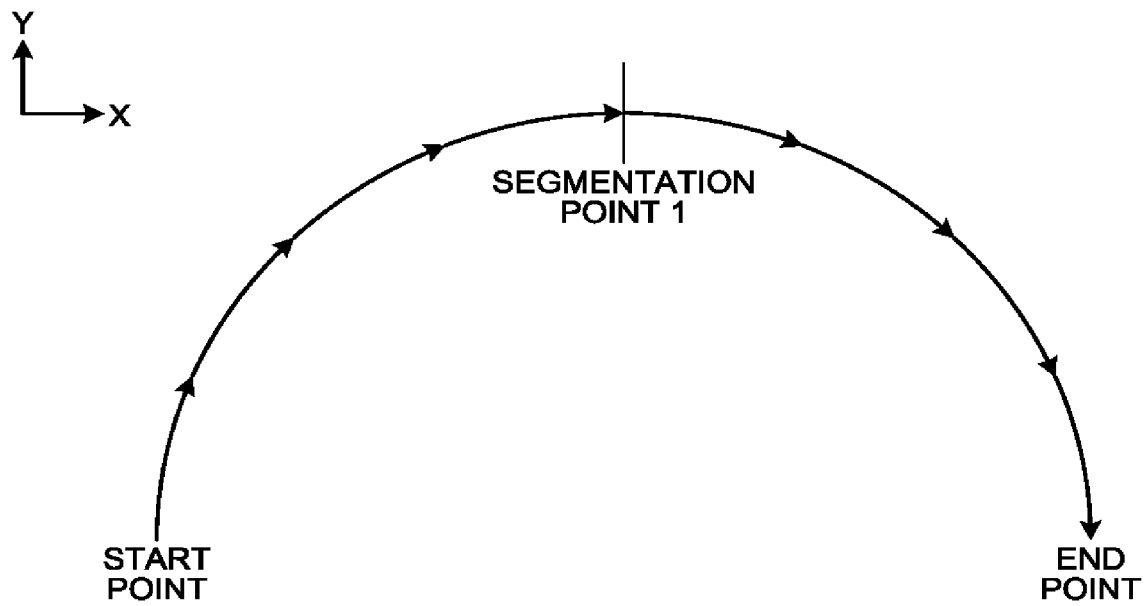
FIG. 9 is a diagram illustrating an example travel path of a tool in a machining program in the first embodiment.

FIG. 9 is a diagram illustrating an example travel path of a tool in the machining program 10 in the first embodiment. In FIG. 9, the machining program 10 is segmented at a segmentation point 1 into two execution units: execution unit 1 and execution unit 2.

Figure 10:
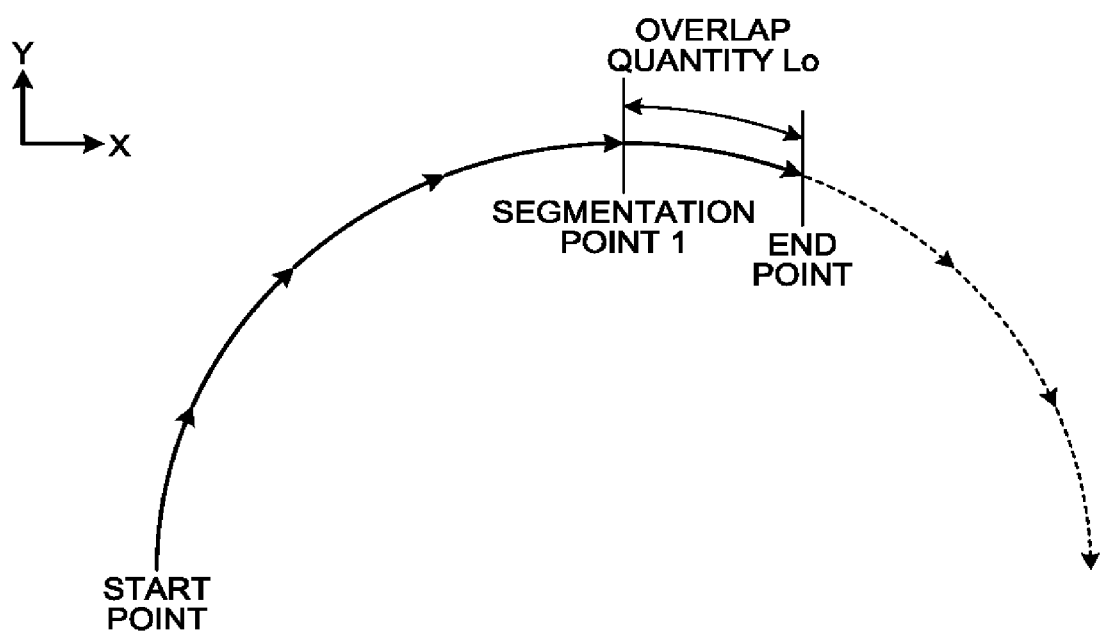
FIG. 10 is a first diagram illustrating an example travel path of the tool in the machining program in the first embodiment with consideration given to the overlap quantity Lo.

FIG. 10 is a first diagram illustrating an example travel path of the tool in the machining program in the first embodiment with the overlap quantity Lo being taken into consideration. As illustrated in FIG. 10, a start point of execution unit 1 is in agreement with "a start point of the machining program", while an end point of execution unit 1 is "a point shifted from the segmentation point 1 toward an end point of the machining program by the overlap quantity Lo".

Figure 11:
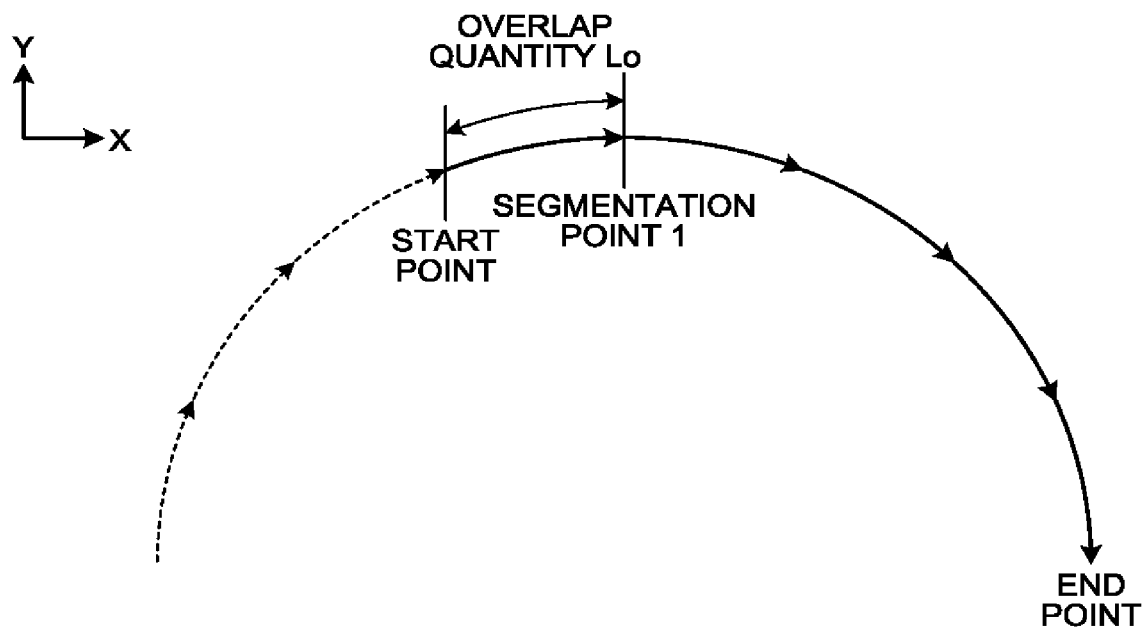
FIG. 11 is a second diagram illustrating an example travel path of the tool in the machining program in the first embodiment with the overlap quantity Lo being taken into consideration.

FIG. 11 is a second diagram illustrating an example travel path of the tool in the machining program in the first embodiment with the overlap quantity Lo being taken into consideration. As illustrated in FIG. 11, a start point of execution unit 2 is "a point shifted from the segmentation point 1 toward the start point of the machining program by the overlap quantity Lo", and an end point of execution unit 2 is in agreement with "the end point of the machining program".

While the segmentation point is in agreement with a block end point for simplicity in FIGS. 9 to 11, the segmentation point does not necessarily have to be in agreement with a block end point and may be any point in the block.

Alternatively, the start point and end point of an execution unit may be any points in a block; the start point or end point of an execution unit may be a block end point closest to a start point or end point obtained by the method described above.

While only one segmentation point is illustrated in FIGS. 9 to 11, a similar method can be employed for segmentation at a plurality of segmentation points.

A specific method of segmenting the machining program into the execution units is described below. In the first embodiment, the machining program 10 is segmented to newly create the segment machining programs and hence provide the separate execution units. Note, however, that segment machining programs do not necessarily have to be generated. For example, a serial number assigned for each line of the machining program, which is a block number of the machining program, may be specified to thereby segment the machining program 10 into the execution units; alternatively, a G code or M code that is a command serving as a segmentation mark may be inserted in the machining program at each segmentation point.

The segmentation unit 110 then adds a machining-mode command to the top of each of the segment machining programs (S5).

Figure 12:
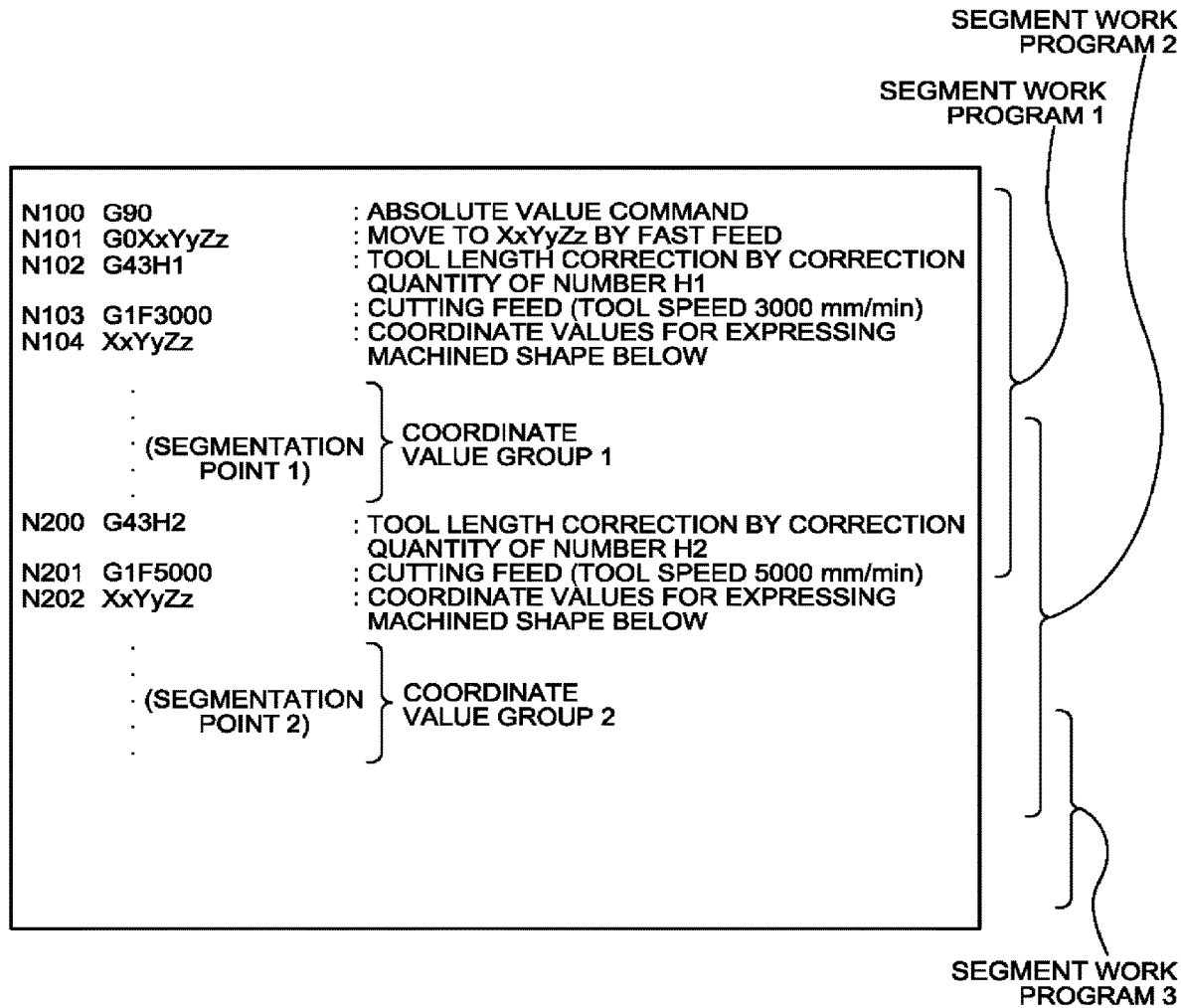
FIG. 12 is a diagram illustrating an example machining program in the first embodiment.

FIG. 12 is a diagram illustrating an example machining program in the first embodiment. The machining program illustrated in FIG. 12 indicates a coordinate value for machining on a block-by-block basis, i.e., on a line-by-line basis. The machining program also indicates machining-mode related commands, such as an F command that is a command speed, G0 that is fast feed, G1 that is a cutting mode, and G43 that is a tool length correction. The top of the machining program illustrated in FIG. 12 indicates machining-mode related commands followed by coordinate values for machining. These coordinate values are referred to as a coordinate value group 1. After the coordinate value group 1, machining-mode related commands are indicated again, and coordinate values for machining are indicated. These coordinate values are referred to as a coordinate value group 2.

A description is made below as to the segment machining programs where a segmentation point 1 is present in the coordinate value group 1 and a segmentation point 2 is present in the coordinate value group 2. In this case, three segment machining programs are generated: a segment machining program 1 from the top of the machining program to the segmentation point 1; a segment machining program 2 from the segmentation point 1 to the segmentation point 2; and a segment machining program 3 from the segmentation point 2 to the bottom of the machining program. Each of the segment machining programs has an overlap added.

Figure 13:
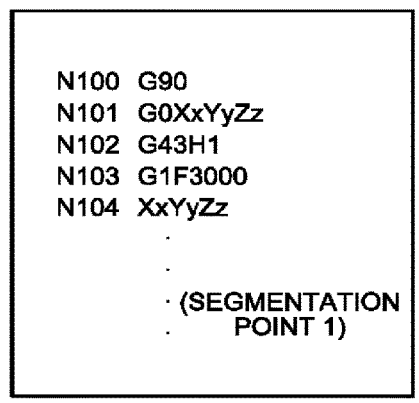
FIG. 13 is a diagram illustrating a segment machining program 1 in the first embodiment.

FIG. 13 is a diagram illustrating the segment machining program 1 in the first embodiment. The segment machining program 1 illustrated in FIG. 13 has an overlap from the segmentation point 1. Since the machining-mode related commands are indicated at the top of the pre-segmentation machining program, there is no need to add the machining-mode related commands in the segment machining program 1.

FIG. 14 is a diagram illustrating the segment machining program 2 has the machining-mode related commands added, in the first embodiment. The top of the segment machining program 2 illustrated in FIG. 14 provides coordinate values for machining, but lacks machining-mode related commands; thus, necessary machining-mode related commands are added at the top of the segment machining program 2. The machining-mode related commands added to the segment machining program 2 are machining-mode related commands issued in the pre-segmentation machining program between the top of the machining program and the top of the segment machining program 2.

FIG. 15 is a diagram illustrating the segment machining program 3 having machining-mode related commands added, in the first embodiment. As illustrated in FIG. 15, machining-mode related commands are added to the top of the segment machining program 3 as in the segment machining program 2. If machining-mode related commands of the same type are issued more than once, only a command that is issued the last should be added. For example, the speed commands, or F commands in FIG. 12 include F3000 mm/min and F5000 mm/min subsequent to F3000 mm/min. There is the overlap between F5000 mm/min and the segmentation point 2 that is the top of the segment machining program 3. Only F5000 mm/min, which is the last speed command issued before the top of the segmented machining program 3, should thus be issued.

All modal commands, which, once issued, remain effective in subsequent blocks, such as an absolute value command, a relative value command, tool length correction, and tool diameter correction, are added as is the above machining-mode related command.

Since the number of segments N is six in the first embodiment, a segment machining program 4 to a segment machining program 6 are generated similarly, and the generated segment machining programs are output to the parallel computation unit 120.

A description is made next as to processing of the parallel computation unit 120 including a plurality of arithmetic units. As described above, the parallel computation unit 120 illustrated in FIG. 1 includes the arithmetic unit 121, the arithmetic unit 122, and the arithmetic unit 123. Specific examples of the arithmetic unit 121, the arithmetic unit 122, and the arithmetic unit 123 can include a processor core, a CPU, a personal computer or server connected to a network, or a virtual computer on a cloud.

When the segmentation unit 110 outputs the segment machining programs with the number of segments being N, the parallel computation unit 120 assigns the segment machining programs to the arithmetic unit 121, the arithmetic unit 122, and the arithmetic unit 123. Since the parallel computation unit 120 illustrated in FIG. 1 includes the arithmetic unit 121, the arithmetic unit 122, and the arithmetic unit 123, the segment machining program 1 is assigned to the arithmetic unit 121, the segment machining program 2 is assigned to the arithmetic unit 122, and the segment machining program 3 is assigned to the arithmetic unit 123.

The arithmetic unit 121, the arithmetic unit 122, and the arithmetic unit 123 perform in parallel the same processing as a numerical control apparatus does, and generate, from the segment machining programs, the segment command 1, the segment command 2, and the segment command 3, respectively, which are command paths for the tool. Specific examples of the processing can include acceleration/deceleration processing that generates a speed waveform for acceleration/deceleration at a predefined acceleration, smoothing processing that smooths the speed waveform generated by the acceleration/deceleration processing, and interpolation processing that computes an interpolation point, which is a tool position per unit time as the tool travels at a post-smoothing-processing speed. The smoothing processing is also referred to as "travel average filter processing". Here, each tool position point per unit time is referred to as an interpolation point, and the whole of interpolation points in a segment machining program is referred to as a segment command.

Figure 16:
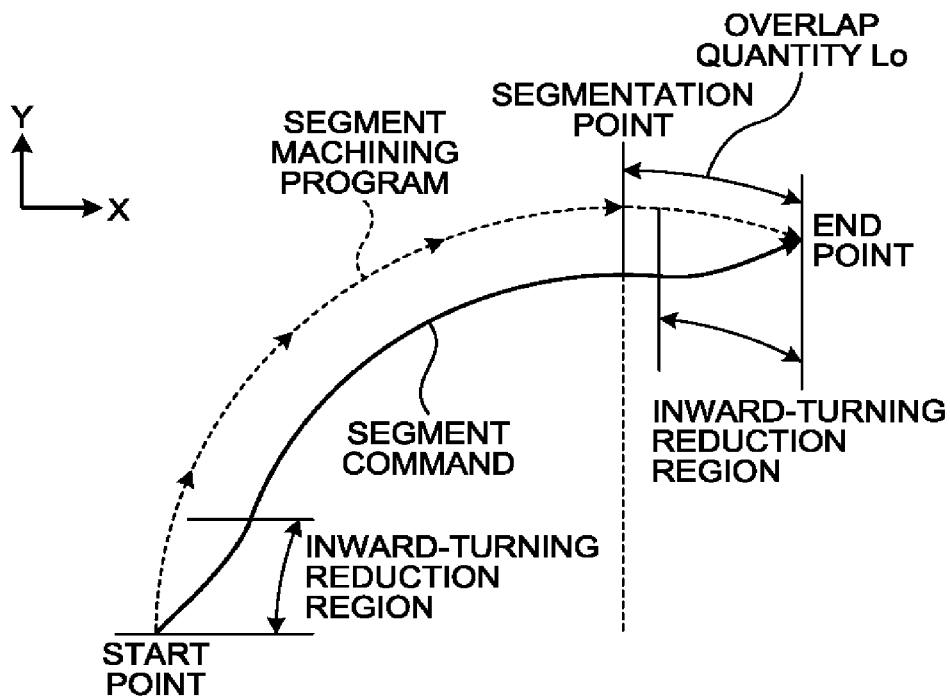
FIG. 16 is a first diagram illustrating an example travel path of the tool, in which inward turning occurs, in the machining program in the first embodiment.
Figure 17:
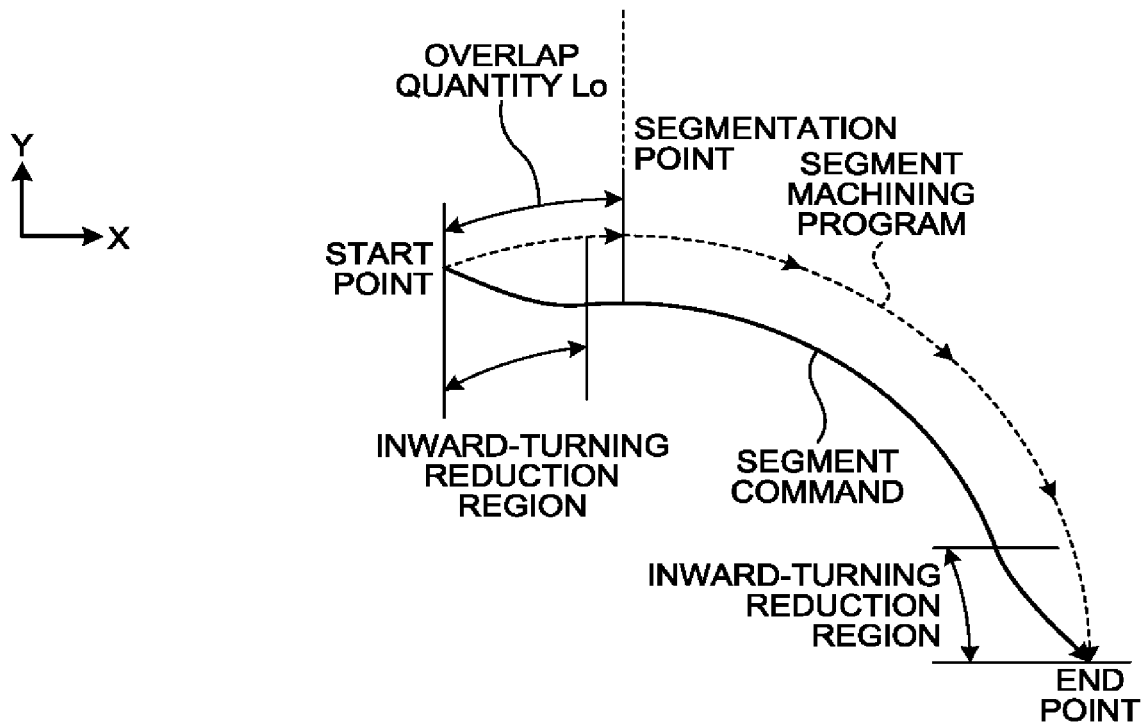
FIG. 17 is a second diagram illustrating an example travel path of the tool, in which inward turning occurs, in the machining program in the first embodiment.

Generally, a smooth path of a segment command generated in the manner as discussed above revolves or turns inward relative to a corresponding segment machining program. A reason why such an inward turning occurs is described below. FIG. 16 is a first diagram illustrating an example travel path of the tool, in which the inward turning occurs, in the machining program in the first embodiment. FIG. 17 is a second diagram illustrating an example travel path of the tool, in which the inward turning occurs, in the machining program in the first embodiment. As illustrated in FIGS. 16 and 17, each of segment commands that result from execution of the segment machining programs illustrated in FIGS. 10 and 11 passes through the start point and end point of the segment machining program such that the segment command has an inward curved shape between the start point and the end point, relative to the shape of the segment machining program.

The segment command, which is generated due to the segmentation of the machining program, turns inward relative to and closer to the segment machining program near the start point and the end point. A region in which the segment command turns inward relative to and closer to the segment machining program is referred to as "an inward-turning reduction region". How close to the segment machining program the segment command turns inward relative to the segment machining program is determined by the command speed, and a length of the inward-turning reduction region is the acceleration distance La illustrated in FIG. 7.

When segmenting the machining program, the segmentation unit 110 adds the overlap quantity Lo, which is equal to or greater than the acceleration distance La. The inward-turning reduction region in each of the segment machining programs thus do not overlap the inward-turning reduction region of the adjacent segment machining program, and in the entire region of the shape of the machining program can include at least one interpolation point outside the inward-turning reduction region. While the machining program is segmented into two for the purpose of explanation in FIGS. 16 and 17, this is similar when a machining program is segmented into more segments.

The arithmetic unit 121, the arithmetic unit 122, and the arithmetic unit 123 execute the segment machining program 1, the segment machining program 2, and the segment machining program 3, respectively, and the parallel computation unit 120 generates the segment command 1, the segment command 2, and the segment command 3 and outputs the segment command 1, the segment command 2, and the segment command 3 to the command-value generation unit 130. Then, the parallel computation unit 120 similarly executes the segment machining program 4, a segment machining program 5, and the segment machining program 6 in parallel and outputs the segment command 4, the segment command 5, and the segment command 6 to the command-value generation unit 130. This processing is repeated until no unexecuted segment machining program is present.

A description is made next as to processing of the command-value generation unit 130. The command-value generation unit 130 generates the series of tool travel commands 11 on the basis of the segment commands output by the arithmetic unit 121, the arithmetic unit 122, and the arithmetic unit 123.

Since the segmentation unit 110 provides the segment machining programs each of which overlaps the adjacent segment machining program, each of the segment commands overlaps the adjacent segment command. The overlapping regions of the segment commands are removed as described below, and then, the segment commands having the overlapping regions removed are coupled together to generate the series of tool travel commands 11 in the first embodiment.

Figure 18:
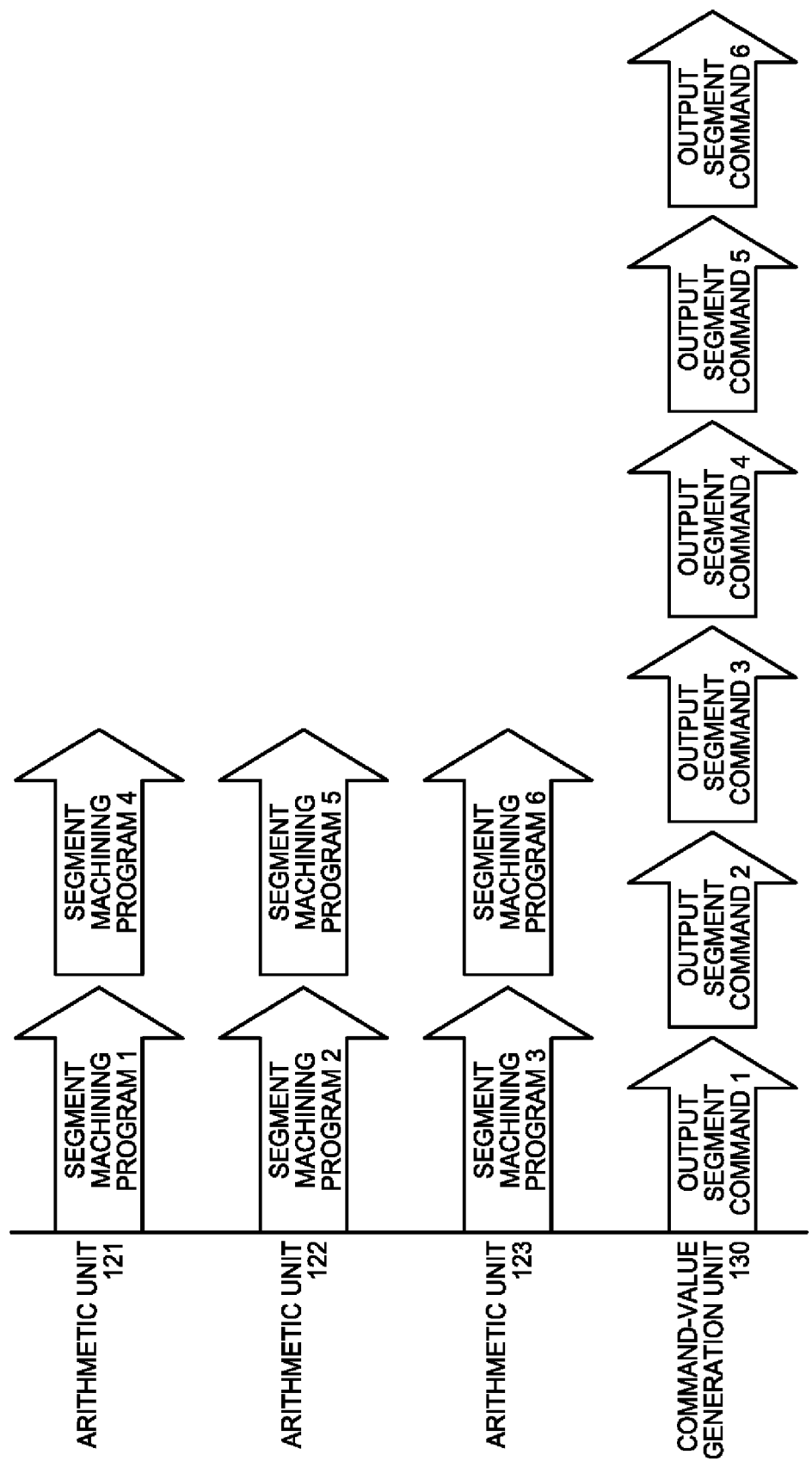
FIG. 18 is a timing chart illustrating the timing of execution of segmented machining programs by a parallel computation unit illustrated in FIG. 1 and the timing of generation of a series of tool travel commands by a command-value generation unit illustrated in FIG. 1 in the first embodiment.

FIG. 18 is a timing chart illustrating the timing of execution of the segment machining programs by the parallel computation unit 120 illustrated in FIG. 1 in the first embodiment and the timing of generation of the series of tool travel commands 11 by the command-value generation unit 130 illustrated in FIG. 1 in the first embodiment.

As described above, while the arithmetic unit 121 executes the segment machining program 1, the arithmetic unit 122 executes the segment machining program 2, and the arithmetic unit 123 executes the segment machining program 3, the parallel computation unit 120 starts generating and outputting the segment command 1, the segment command 2, and the segment command 3. Strictly speaking, the segment command is not completed during the execution of the segment machining program; thus, the parallel computation unit 120 sequentially outputs points each indicating a tool position per unit time, which is an interpolation point of the segment command.

When receiving the segment command 1, the segment command 2, and the segment command 3 from the parallel computation unit 120, the command-value generation unit 130 outputs the segment command 1. At this point in time, the segment command 2 and the segment command 3 are stored in a storage area in the command-value generation apparatus 100. Upon completing outputting of the segment command 1, the command-value generation unit 130 removes the overlapping regions and adjusts abrupt change in spacing between the interpolation points at a point of changeover of the segment command, as described below, and outputs the segment command 2. The arithmetic unit 121, which has completed executing the segment machining program 1 at the time of the output of the segment command 2, starts executing the segment machining program 4 and outputs the segment command 4 to the command-value generation unit 130. As soon as the arithmetic unit 122 completes executing the segment machining program 2, the parallel computation unit 120 starts executing the segment machining program 5 and outputs the segment command 5 to the command-value generation unit 130. As soon as the arithmetic unit 123 completes executing the segment machining program 3, the parallel computation unit 120 starts executing the segment machining program 6, and outputs the segment command 6 to the command-value generation unit 130. While FIG. 18 shows that the segment machining program 1, the segment machining program 2, and the segment machining program 3 finished being executed at the same time, this is not a limitation in the present invention.

Figure 19:
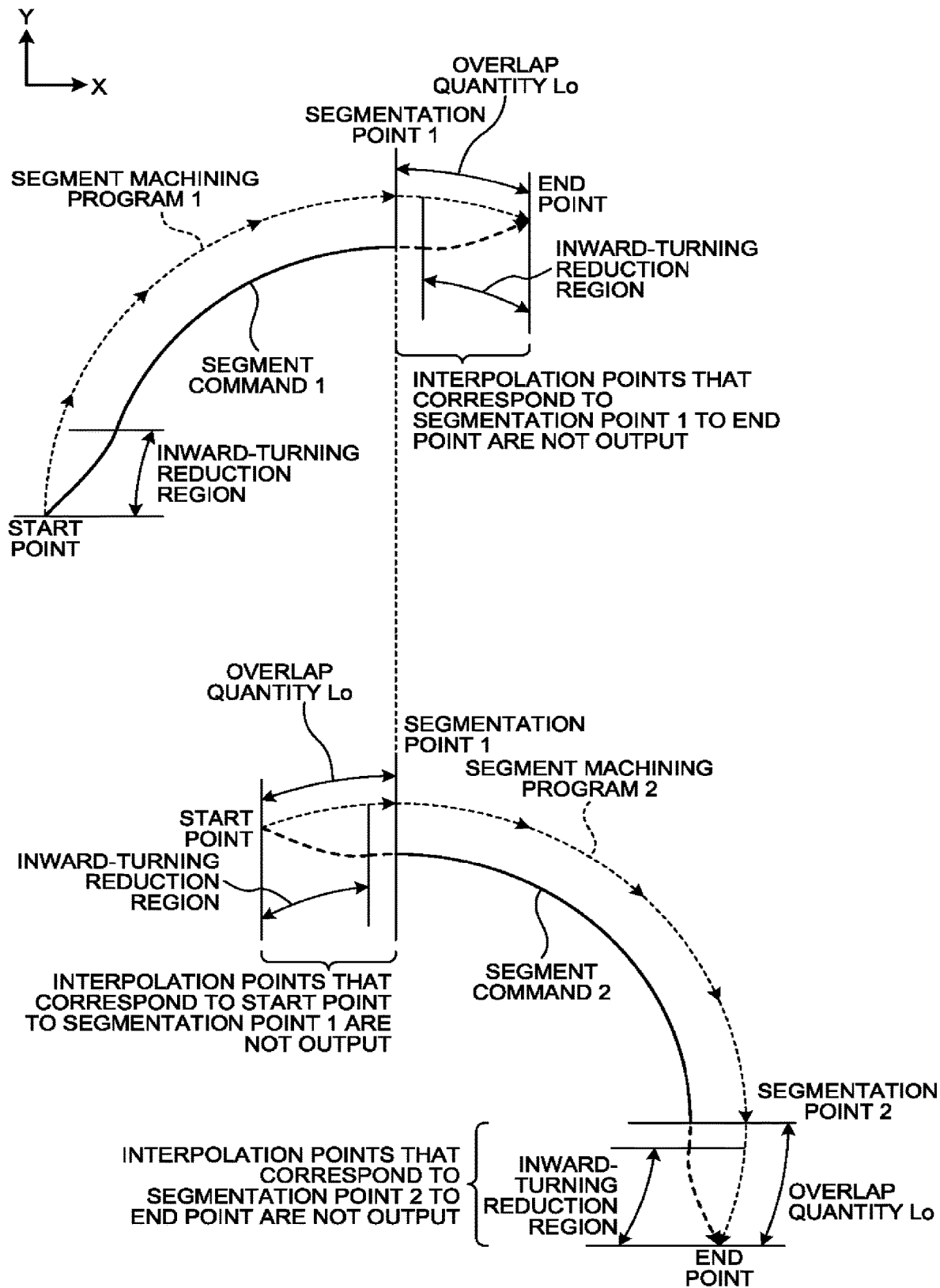
FIG. 19 is a diagram illustrating examples of the segment machining program 1 and the segment machining program 2, and a segment command 1 and a segment command 2 in the first embodiment.

A description is made next as to the removal of the overlapping region from each of the segment commands with reference to FIG. 19. FIG. 19 is a diagram illustrating examples of the segment machining program 1 and the segment machining program 2, and the segment command 1 and the segment command 2 in the first embodiment. As illustrated in FIG. 19, the segment machining program 1 and the segment machining program 2 are separate from each other at the segmentation point 1, and the segment machining program 1 and the segment machining program 2 overlap by the overlap quantity Lo with the segmentation point 1 located at the center.

Upon receiving the segment command 1 from the parallel computation unit 120, the command-value generation unit 130 starts outputting the segment command 1 as the tool travel command 11; when having output as far as an interpolation point that corresponds to the segmentation point 1 of the segment machining program 1, the command-value generation unit 130 starts outputting the segment command 2. That is, the command-value generation unit 130 does not output the interpolation points of the segment command 1 that correspond to the segment machining program 1 ranging from the segmentation point 1 to the end point.

Regarding the segment command 2, the command-value generation unit 130 starts outputting the interpolation points from an interpolation point that corresponds to the segmentation point 1. That is, the command-value generation unit 130 does not output interpolation points of the segment command 2 that correspond to the segment machining program 2 ranging from the start point to the segmentation point 1. The command-value generation unit 130 sequentially outputs the interpolation points from the interpolation point that corresponds to the segmentation point 1 and, when having output as far as an interpolation point that corresponds to the segmentation point 2, the command-value generation unit 130 starts outputting the segment command 3. The segmentation point 2 is a point at which the segment machining program 2 and the segment machining program 3 are separate from each other. That is, the command-value generation unit 130 does not output the interpolation points of the segment command 2 that correspond to the segment machining program 2 ranging from the segmentation point 2 to the end point, either.

Regarding the segment command 3 (not illustrated), the command-value generation unit 130 starts outputting the interpolation points from an interpolation point that corresponds to the segmentation point 2. That is, the command-value generation unit 130 does not output the interpolation points of the segment command 3 that correspond to the segment machining program 3 ranging from the start point to the segmentation point 2.

The processing as described above is repeated sequentially, and the segment commands up to the segment command 6 are output. The segment command 4 (not illustrated) overlap at both of the start point and the end point; thus, the command-value generation unit 130 neither outputs the interpolation points of the segment command 4 that correspond to the segment machining program 4 ranging from the start point to a segmentation point 3, nor outputs the interpolation points of the segment command 4 that correspond to the segment machining program 4 ranging from a segmentation point 4 to the end point. The same goes for the segment command 5, but the command-value generation unit 130 outputs interpolation points of the segment command 6 up to the end point because the segment command 6 does not overlap at its end point side.

A description is made next as to how to obtain an interpolation point that corresponds to each segmentation point. To generate a smooth path and speed waveform, the numerical control apparatus provides the path of each segment command with the shape curving inward of the path of the corresponding segment machining program, as illustrated in FIG. 19. That is, the length of the path of the segment command differs from the length of the path of the corresponding segment machining program.

When the path is smoothed by the travel average filter, an interpolation point x(n) on a path (a post-travel-average-filter path) of a tool travel command is expressed by below expression (3) where the interpolation point x(n) is expressed by an average value of a point X on a path (a pre-travel-average-filter path) of a machining program.

[Formula 3]

$$x(n) = \frac{X(n-m+1) + X(n-m+2) + \ldots + X(n)}{m} \quad (3)$$

Here, n in expression (3) described above represents a number of an interpolation point from the start point to the end point. Also, m in expression (3) described above represents a time constant of the travel average filter and is set by a parameter. When a point X on the pre-travel-average-filter path is obtained from expression (3) described above, expression (4) described below is obtained.

[Formula 4]

$$X(n) = m(x(n) - x(n-1)) + X(m-n) \quad (4)$$

Using above expression (4) enables a point X on the pre-travel-average-filter path to be calculated from an interpolation point x on the post-travel-average-filter path. This allows calculation of a distance in the pre-travel-average-filter path. An interpolation point that corresponds to a segmentation point is defined as the interpolation point x located the overlap quantity Lo distant from the start point or end point on the pre-travel-average-filter path.

While an interpolation point that corresponds to a segmentation point is calculated by calculating the distance on the pre-travel-average-filter path from an interpolation point on the post-travel-average-filter path in the first embodiment, this is not a limitation in the present invention; each of the arithmetic unit 121, the arithmetic unit 122, and the arithmetic unit 123 may output a segment command including an appropriate flag on an interpolation point that corresponds to a segmentation point.

Figure 20:
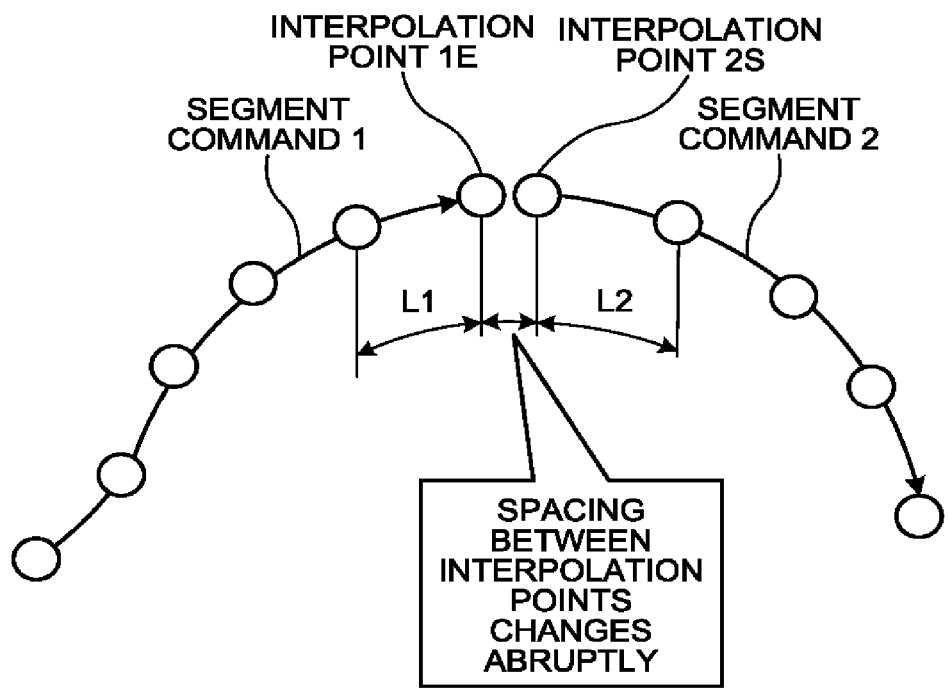
FIG. 20 is a diagram illustrating an example of the spacing between interpolation points at a point of changeover of segment command in the first embodiment.

Generally, the spacing between interpolation points abruptly changes at the location of the interpolation points that correspond to a segmentation point, that is, at a point of changeover from one segment command to another. FIG. 20 is a diagram illustrating an example of the spacing between interpolation points at the point of changeover of segment command in the first embodiment. As illustrated in FIG. 20, the spacing between the interpolation points where changeover from the segment command 1 to the segment command 2 takes place differs from the spacing between other interpolation points. An interpolation point represents a tool position per unit time, and the spacing between interpolation points represents a tool speed. That is, a change in spacing between interpolation points causes a change in tool speed, causing a machining defect.

Figure 21:
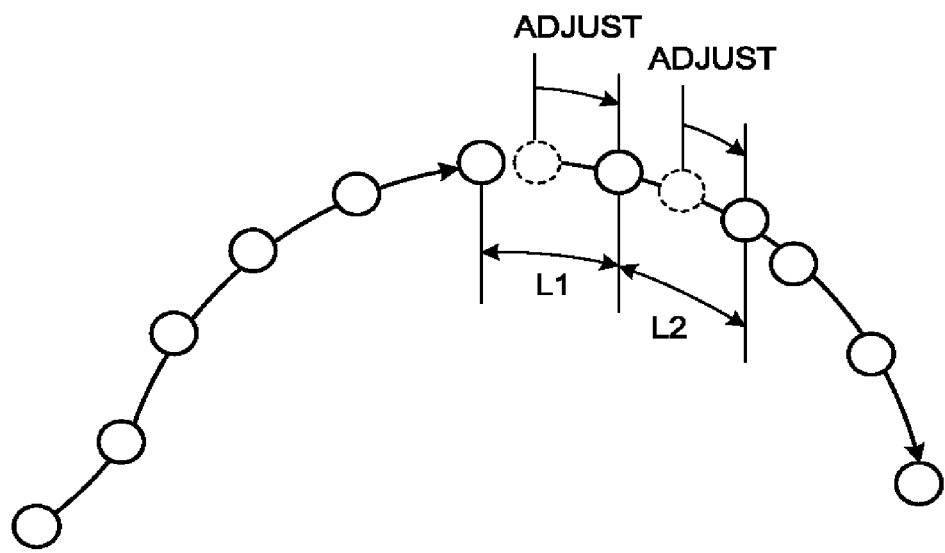
FIG. 21 is a diagram illustrating an example of the adjusted spacing between interpolation points where the changeover of segment command occurs in the first embodiment.

FIG. 21 is a diagram illustrating an example of the adjusted spacing between interpolation points where the changeover of the segment command occurs in the first embodiment. As illustrated in FIG. 21, the command-value generation unit 130 adjusts the position of an interpolation point on a path of a corresponding segment command such that the spacing between interpolation points does not change even at the point of changeover of the segment command.

As illustrated in FIG. 20, the last interpolation point of the segment command 1 output by the command-value generation unit 130, i.e., the last interpolation point outside an overlapping region, is denoted by an interpolation point 1E. The first interpolation point of the segment command 2 output by the command-value generation unit 130, i.e., the first interpolation point outside an overlapping region, is denoted by an interpolation point 2S. The command-value generation unit 130 adjusts the position of the interpolation point 2S along the path of the segment command 2 such that the spacing between the interpolation point 1E and the interpolation point 2S is equal to spacing L1 between the interpolation point 1E and the preceding interpolation point. Alternatively, the command-value generation unit 130 may adjust the position of the interpolation point 2S along the path of the segment command 2 such that the spacing between the interpolation point 1E and the interpolation point 2S is equal to spacing between the interpolation point 1E and a subsequent interpolation point that is not output by the command-value generation unit 130. The command-value generation unit 130 also adjusts the position of an interpolation point subsequent to the interpolation point 2S along the path of the segment command 2 such that the spacing between the post-adjustment interpolation point 2S and the subsequent interpolation point is equal to spacing L2 between the pre-adjustment interpolation point 2S and the subsequent interpolation point. Repeating this processing sequentially can generate a command that does not cause change in tool speed throughout the entire region of the tool travel commands, thus inhibiting a machining defect.

When the positions of interpolation points are adjusted by the method described above, all interpolation points after the segment command 2 require adjustment. To avoid adjusting all of the interpolation points, the locations of interpolation points are adjusted tolerating speed changes equal to or smaller than a preset allowable speed change, such that an amount of adjustment of the locations of the interpolation points is reduced. As a result, only the adjustment of part of the locations of the interpolation points can inhibit the speed change at a point of changeover of the segment command.

The outputting of the tool travel commands with the overlapping regions removed, as described above, can provide the tool travel commands identical with those generated when the machining program is not segmented.

Performing the processing described in the first embodiment inhibits a tool travel command change resulting from the segmentation of the machining program; thus, a machining program can be segmented at any position. This allows efficient use of calculation resources of the arithmetic units. The first embodiment is particularly effective in an environment that allows use of many arithmetic units, such as the cloud.

In the first embodiment, segment commands can be generated in advance by using the plurality of arithmetic units. The segment commands for portions that have short line segments and thus impose heavy processing load can also be generated in advance; thus, tool travel commands can be computed with an appropriate computing cycle and unnecessary deceleration can be prevented.

The number of the segment programs is six in the first embodiment for simplicity; however, the segmentation of the machining program into further smaller segments can further distribute the processing load among the arithmetic units and thereby prevent unnecessary deceleration.

The configuration of the first embodiment and a conventional technique that serves as a comparative example are described in comparison below. Note that this comparative example also can generate tool travel commands by computing the tool travel commands in parallel.

Figure 22:
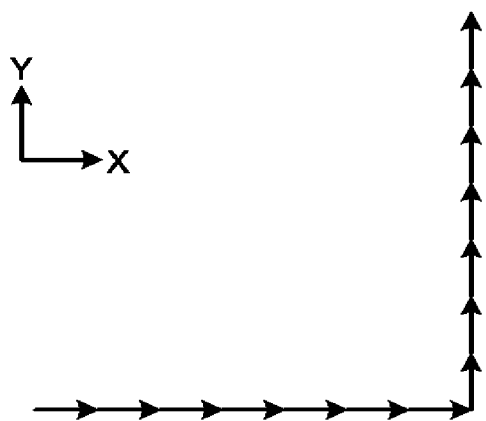
FIG. 22 is a first diagram illustrating an example machining program shape in the first embodiment.

The command-value generation apparatus 100 reads ahead a plurality of line segments from a machining program and generates tool travel commands with the path, speed, and acceleration smoothed so that the machine tool does not vibrate. FIG. 22 is a first diagram illustrating an example machining program shape in the first embodiment. A description is made below as to a case in which the machining program shape is a 90° corner that involves travel in only an X axis and then travel in only a Y axis in an XY plane as illustrated in FIG. 22.

Figure 23:
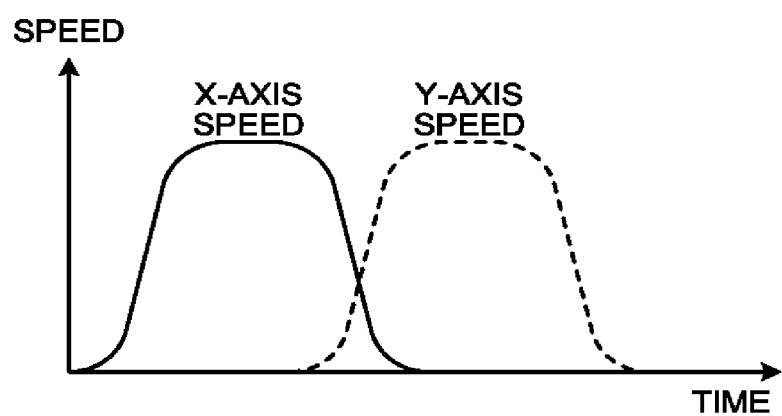
FIG. 23 is a diagram illustrating an X-axis speed and Y-axis speed exhibited when the machining program shape in FIG. 22 is executed in the first embodiment, with the horizontal axis representing time and the vertical axis representing speed.

FIG. 23 is a diagram illustrating an X-axis speed and Y-axis speed exhibited when the machining program shape in FIG. 22 is executed in the first embodiment, with the horizontal axis representing time and the vertical axis representing speed. By reading ahead line segments of the machining program, the command-value generation apparatus 100 computes the X-axis speed and Y-axis speed that are smooth, with the X-axis speed and the Y-axis speed overlapping each other in a corner portion as illustrated in FIG. 23. While smoothing is performed up to acceleration in the speed waveforms illustrated in FIG. 23, this is not a limitation in the present invention; alternatively, each axis speed may be obtained by smoothing up to speed, or each axis speed may be obtained by smoothing up to jounce.

Figure 24:
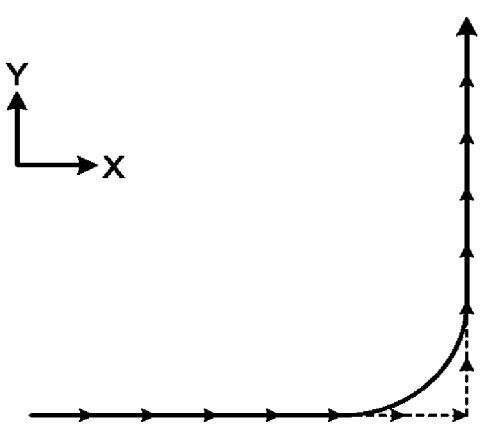
FIG. 24 is a diagram illustrating example tool travel commands generated when the machining program shape in FIG. 22 is executed in the first embodiment.

FIG. 24 is a diagram illustrating example tool travel commands generated when the machining program shape in FIG. 22 is executed in the first embodiment. The command-value generation apparatus 100 reads ahead and thereby causes the X-axis speed and the Y-axis speed to overlap each other in the corner portion, thereby causing the X axis and the Y axis to operate simultaneously and thus generating tool travel commands having a smooth shape in the corner portion as illustrated in FIG. 24.

Figure 25:
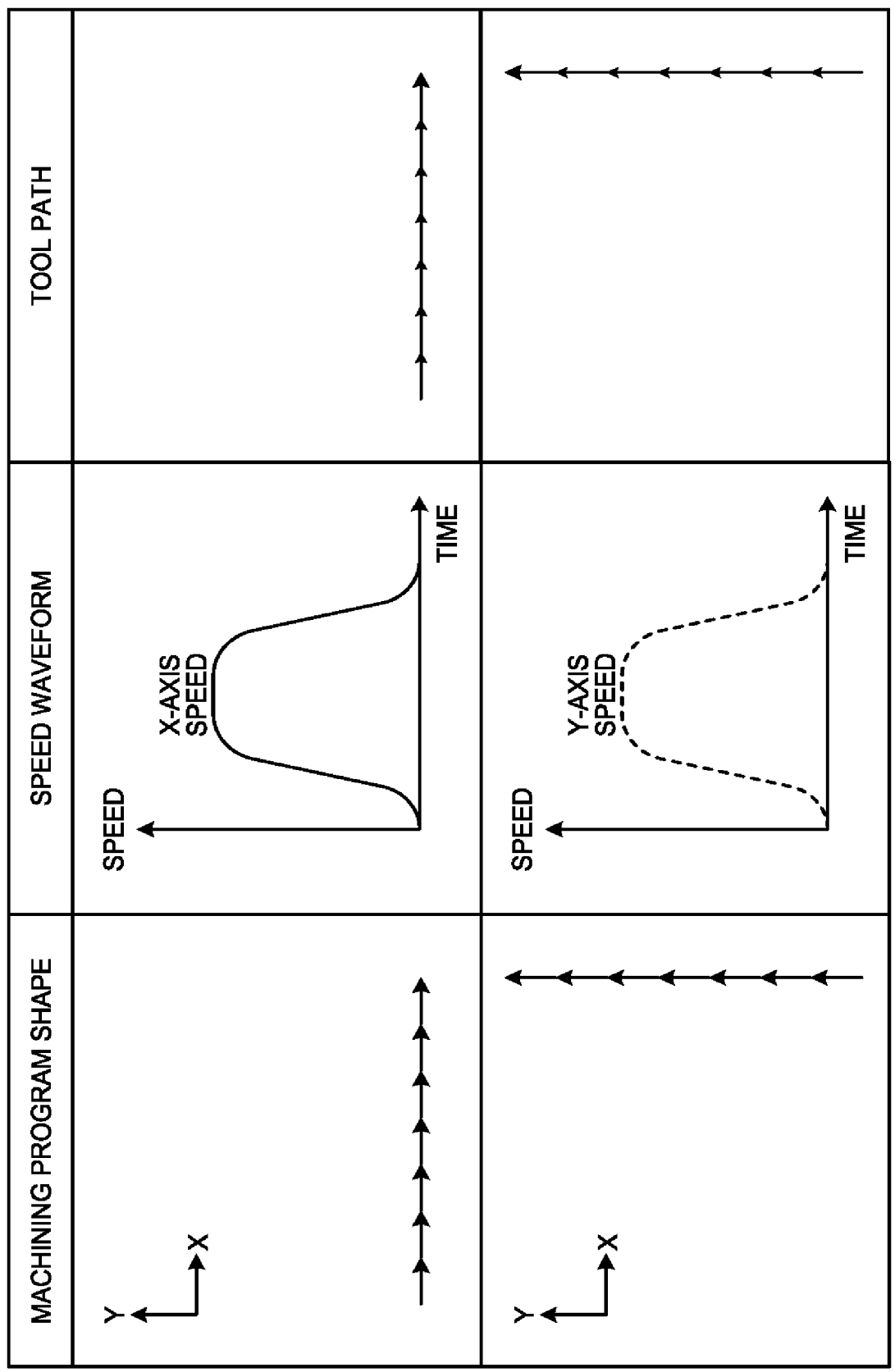
FIG. 25 is a diagram illustrating speed waveforms provided when the machining program shape in FIG. 22 is executed and tool paths in the first embodiment.
Figure 26:
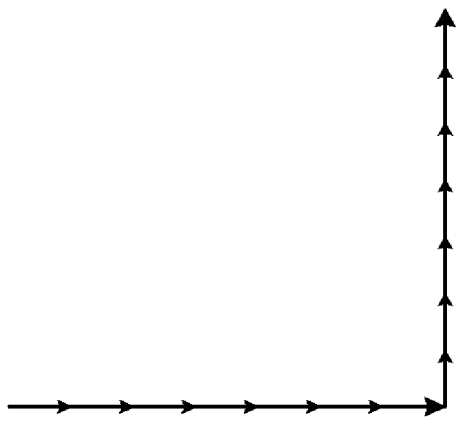
FIG. 26 is a diagram illustrating example tool travel commands generated when the machining program shape in FIG. 22 is executed in the first embodiment.

A description is made below as to another case in which the machining program having the 90° corner in the XY plane illustrated in FIG. 22 is segmented into two at the corner portion, and the segment machining programs are operated by different arithmetic units to produce tool travel commands. In this case, the travel in only the X axis and the travel in only the Y axis are computed by the different arithmetic units. The X-axis speed and the Y-axis speed are computed by the different arithmetic units and there is no overlap between the X-axis speed and the Y-axis speed; thus, machining program shapes obtained after the segmentation are identical with the respective tool travel commands, which are tool paths, as illustrated in FIG. 25. FIG. 25 is a diagram illustrating speed waveforms provided when the machining program shape in FIG. 22 is executed and tool paths in the first embodiment. This is because, although a generated path would be otherwise smooth as the path has its shapes affecting each other before and after a point of segmentation of the machining program, the segmentation of the machining program causes the segment machining programs to be executed separately, thereby generating tool travel commands that pass the point of the segmentation. FIG. 26 is a diagram illustrating example tool travel commands generated when the machining program shape in FIG. 22 is executed in the first embodiment. When the machining is performed on the basis of the tool travel commands illustrated in FIG. 26, the corner portion is not smoothed and the tool travel commands produce a shape identical with the machining program shape; thus, tool travel commands that smooth the corner portion are not generated.

Figure 27:
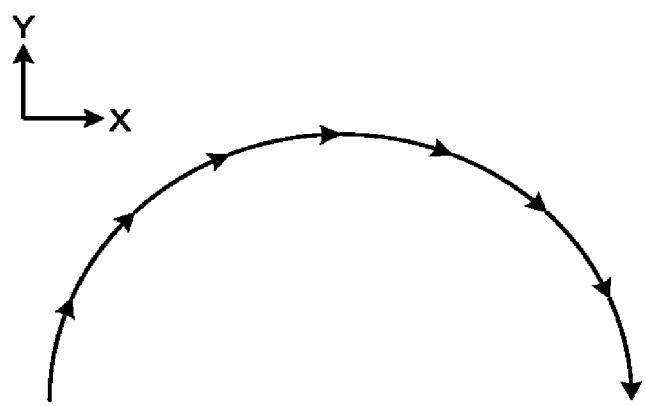
FIG. 27 is a second diagram illustrating an example machining program shape in the first embodiment.
Figure 28:
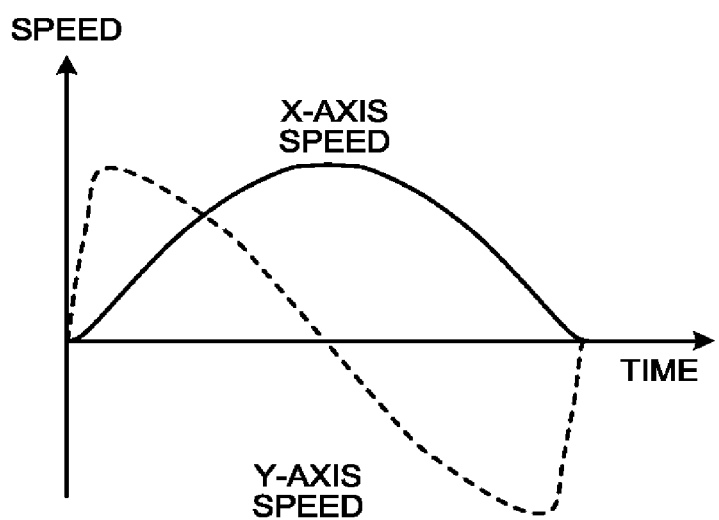
FIG. 28 is a diagram illustrating the X-axis speed and Y-axis speed exhibited when the machining program shape in FIG. 27 is executed in the first embodiment, with the horizontal axis representing time and the vertical axis representing speed.

FIG. 27 is a second diagram illustrating an example machining program shape in the first embodiment. In FIG. 27, the machining program shape is a semicircle in the XY plane. In the case of the arc shape, while each axis speed basically follows a trigonometric function, the speed increase from zero at a start point and then decreases toward an end point where the speed of zero is provided. FIG. 28 is a diagram illustrating the X-axis speed and Y-axis speed exhibited when the machining program shape in FIG. 27 is executed in the first embodiment, with the horizontal axis representing time and the vertical axis representing speed. When the travel average filter is applied, a smooth speed waveform can be generated for each axis as illustrated in FIG. 28.

Figure 29:
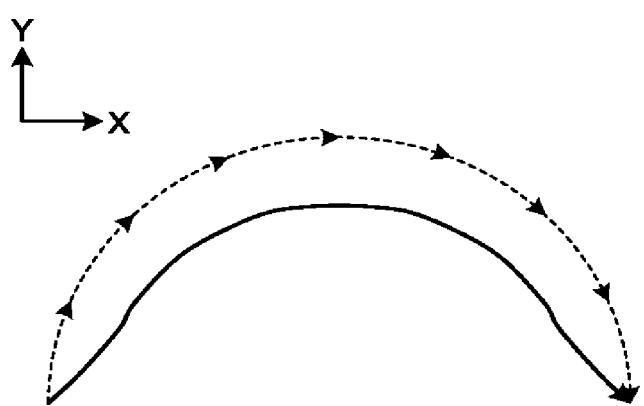
FIG. 29 is a diagram illustrating example tool travel commands generated when the machining program shape in FIG. 27 is executed in the first embodiment.

FIG. 29 is a diagram illustrating example tool travel commands generated when the machining program shape in FIG. 27 is executed in the first embodiment. Since delay is caused in the speed waveform of each axis due to the travel average filter, the tool travel command provides a path extending from the start point of the machining program to the end point of the machining program such that the path has a curved shape inside the machining program shape as illustrated in FIG. 29.

Figure 30:
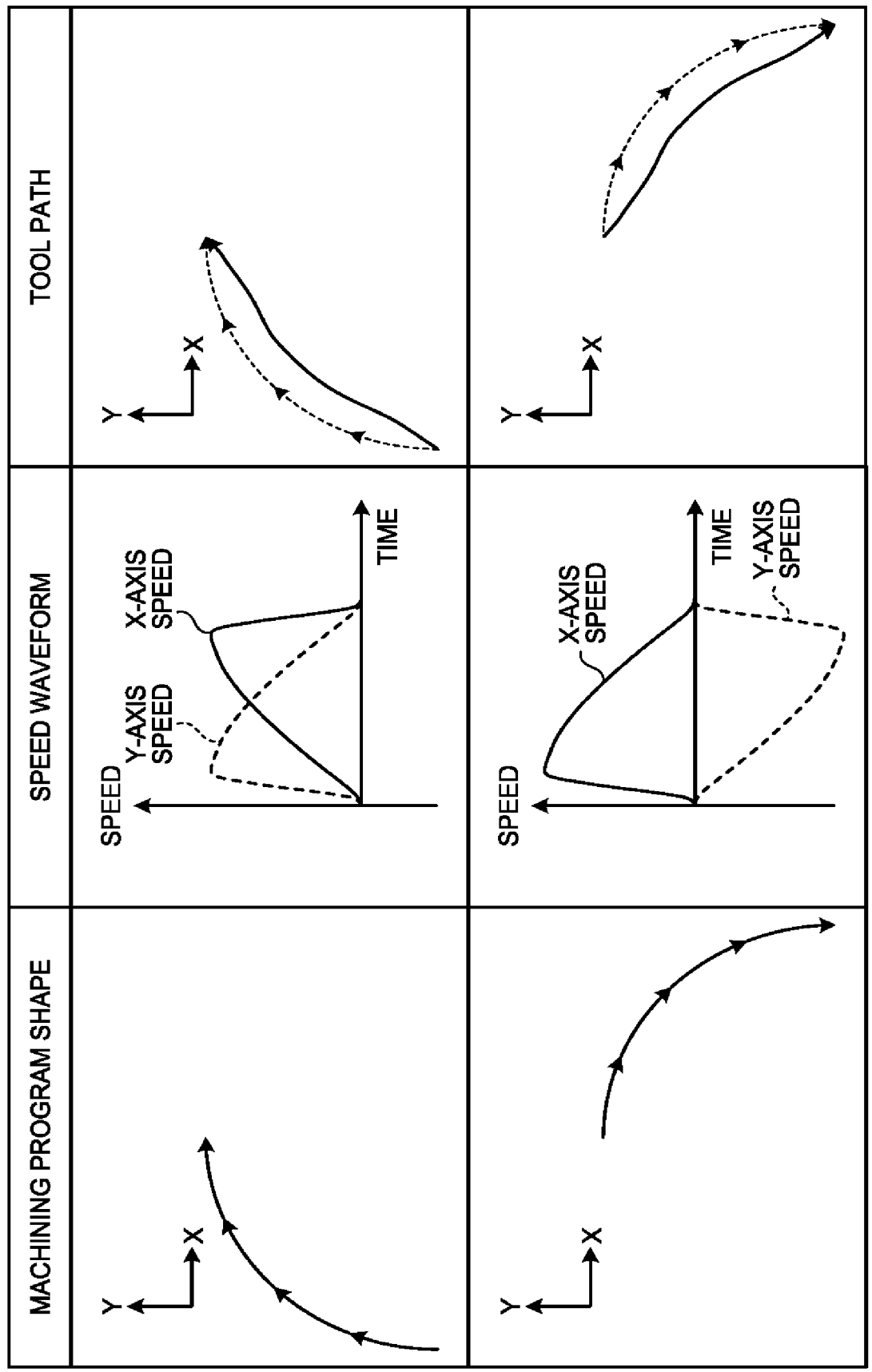
FIG. 30 is a diagram illustrating speed waveforms provided when the machining program shape in FIG. 27 is executed and tool paths in the first embodiment.
Figure 31:
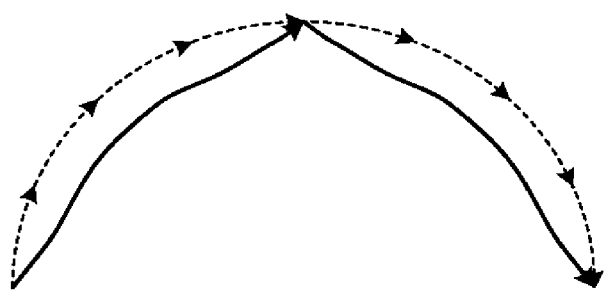
FIG. 31 is a diagram illustrating example tool travel commands generated when the machining program shape in FIG. 27 is executed in the first embodiment.

A description is made below as to another case in which the machining program of the semicircle in the XY plane illustrated in FIG. 27 is segmented into halves and the segment machining programs are operated by different arithmetic units to produce tool travel commands. In this case also, the segment machining programs are executed separately and thus each axis speed reaches zero at the point of the segmentation. The tool travel command provides a tool path extending from the start point of the machining program through the point of the segmentation to the end point of the machining program such that the paths each defined between the points provide a curve shape inside the machining program shape as illustrated in FIG. 30. FIG. 30 is a diagram illustrating speed waveforms provided when the machining program shape in FIG. 27 is executed and tool paths in the first embodiment. FIG. 31 is a diagram illustrating example tool travel commands generated when the machining program shape in FIG. 27 is executed in the first embodiment. When the machining is performed on the basis of these tool travel commands, the tool path is formed that extends from the start point through the point of the segmentation to the end point such that the paths each defined between the points provide a curved shape inside the machining program shape as illustrated in FIG. 31. In other words, the shape having a protrusion at the point of the segmentation is formed.

As described above, if a machining program is segmented during the machining, tool travel commands that pass the point of the segmentation are generated; these tool travel commands are different from tool travel commands generated from the machining program without the segmentation. Such tool travel commands thus generated cause a significant change in the path of tool travel commands at the point of the segmentation, thereby causing a machining defect, such as a flaw on a machined surface.

In the case of the comparative example, the machining program can thus be segmented only at a position that separates machining processes that include, for example, rough processing, semi-finishing, and finishing, where machining is suspended temporarily.

The number of segments is thus limited by the number of machining processes; this indicates that there is room for improvement in the use of a plurality of arithmetic units. Furthermore, if machining is performed without suspension to form a continuous shape, the machining program cannot be segmented and thus its tool travel command needs to be generated using a single arithmetic unit; this poses a problem of failure to enhance the speed.

In the first embodiment, tool travel commands can be generated swiftly by using a plurality of arithmetic units also when a continuous machined shape is formed without interruption or when the number of arithmetic units is greater than the number of machining processes.

Second Embodiment

Figure 32:
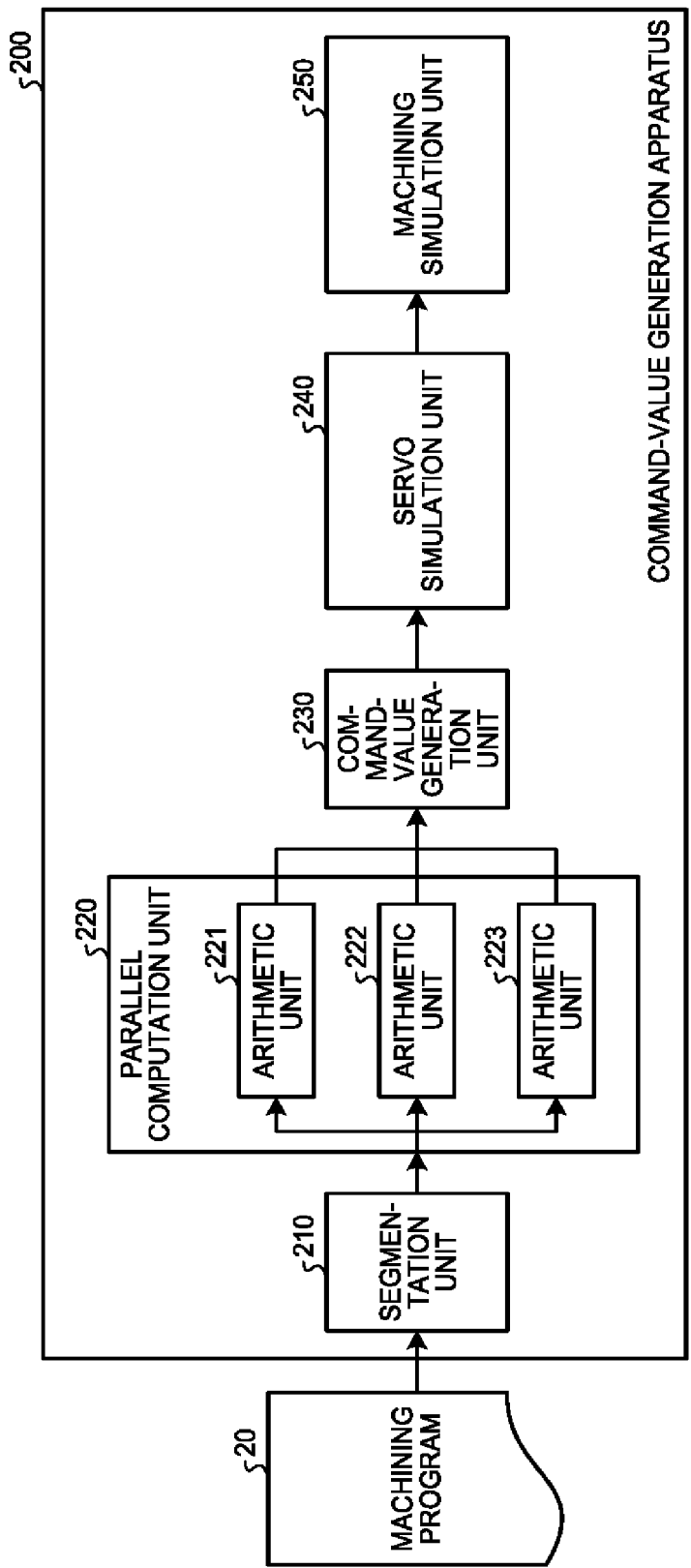
FIG. 32 is a diagram illustrating a configuration of a command-value generation apparatus according to a second embodiment.

FIG. 32 is a diagram illustrating a configuration of a command-value generation apparatus according to a second embodiment of the present invention. A command-value generation apparatus 200 illustrated in FIG. 32 can simulate a machined shape of a workpiece when tool travel commands are generated in accordance with a machining program 20 that is input into the apparatus 200. The description of the first embodiment should be referenced for constituent elements in the second embodiment similar to those in the first embodiment; redundant description is omitted in the second embodiment.

Conventional machining simulation simulates a machined shape of a workpiece on the basis of a machining program shape in many cases. However, actual machining is performed on the basis of a tool travel command having various types of correction made to the machining program. The correction made to the machining program is the acceleration/deceleration, the tool correction, or the coordinate transformation. Such correction may cause a machining defect such as a flaw on a workpiece. Unfortunately, the simulation of the machined shape on the basis of the machining program shape does not include such machining defects. In the second embodiment, the machined shape of a workpiece is simulated on the basis of a servo response obtained from tool travel commands; thus, a flaw resulting from the correction, which is the acceleration/deceleration, the tool correction, or the coordinate transformation, can be also simulated.

The command-value generation apparatus 200 includes a segmentation unit 210, a parallel computation unit 220, a command-value generation unit 230, a servo simulation unit 240, and a machining simulation unit 250. The segmentation unit 210 segments the machining program 20 into execution units. The parallel computation unit 220 generates a segment command in accordance with the machining program for each execution unit. The segment command is a tool travel command for each execution unit. The command-value generation unit 230 generates a series of tool travel commands from the segment commands. The servo simulation unit 240 generates a servo response by simulating an operation of a servo system of a machine tool (not illustrated) when the tool travel commands are input into the servo simulation unit 240. The machining simulation unit 250 simulates a machined shape of a workpiece on the basis of the servo response. Alternatively, the servo simulation unit 240 may be omitted and a machining simulation may be performed on the basis of the tool travel commands or the segment commands.

The parallel computation unit 220 includes arithmetic units 221, 222, and 223. The parallel computation unit 220 is configured by using a multi-core CPU, a personal computer that includes a plurality of CPUs, or a server or cloud system that is connected to a communication line. While the parallel computation unit 220 includes three arithmetic units in FIG. 32, this is not a limitation in the present invention; it is only required that the parallel computation unit 220 include at least one arithmetic unit. A greater number of arithmetic units of the parallel computation unit 220 increases the speed with which the tool travel commands are generated; thus, the number of arithmetic units may be determined in accordance with a target value for speed enhancement.

The segmentation unit 210 segments the input machining program 20 into the execution units and outputs, to the parallel computation unit 220, a segment machining program for each execution unit.

The parallel computation unit 220 assigns the segment machining programs to the arithmetic units 221, 222, and 223 by execution unit. The arithmetic unit 221, the arithmetic unit 222, and the arithmetic unit 223 each perform processing of the acceleration/deceleration and the coordinate transformation, sequentially generate the segment commands for output to the command-value generation unit 230. The segment command is the tool travel command for each execution unit. The arithmetic unit 221, the arithmetic unit 222, and the arithmetic unit 223 are operated in parallel; when completing generating a segment command for one execution unit, each of the arithmetic units starts generating a segment command for a subsequent execution unit, and this process is repeated until no unprocessed execution unit is present.

The command-value generation unit 230 generates the series of tool travel commands from the segment commands for the respective execution units and outputs the generated tool travel commands to the servo simulation unit 240. The command-value generation unit 230 is configured by using a single CPU, a personal computer that includes a single CPU, or a server or cloud system that is connected to a communication line. Alternatively, the command-value generation unit 230 may be configured by using a multi-core CPU, a personal computer that includes a plurality of CPUs, or a server or cloud system that is connected to a communication line, as with the parallel computation unit 220.

The servo simulation unit 240 estimates a servo response from the tool travel commands by using a preset servo model and outputs the estimated servo response to the machining simulation unit 250. On the basis of the servo response from the servo simulation unit 240, the machining simulation unit 250 simulates a machined shape of a workpiece that will be obtained when the machine tool operates. The machining simulation unit 250 then outputs the simulated shape to an output device (not illustrated). Examples of the output device here can include a display.

A detailed description is made next as to processing of each of the constituent elements. Processing of the segmentation unit 210 and that of the parallel computation unit 220 are similar to that of the segmentation unit 110 and that of the parallel computation unit 120 in the first embodiment, respectively, and thus the description is omitted.

Figure 33:
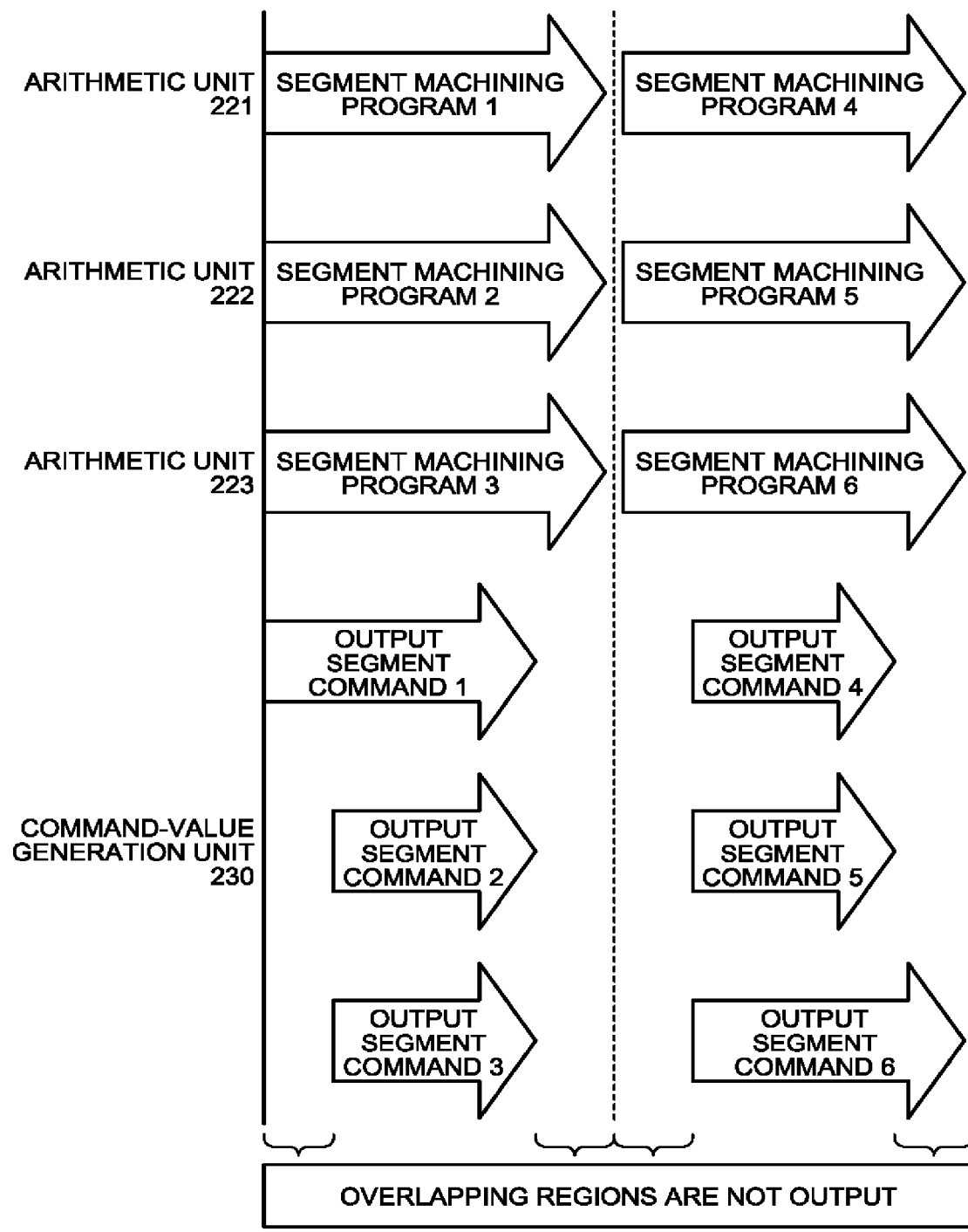
FIG. 33 is a timing chart illustrating the timing of execution of the segment machining programs by a parallel computation unit illustrated in FIG. 32 and the timing of generation of a series of tool travel commands by a command-value generation unit illustrated in FIG. 32 in the second embodiment.

Processing performed by the command-value generation unit 230 is also similar to that performed by the command-value generation unit 130 in the first embodiment. That is, the segment commands except for the overlapping regions are sequentially output from the top one, such that the series of tool travel commands are generated. If any sequence of the tool travel commands is acceptable in a process subsequent to outputting of the command-value generation unit 230, the segment commands can be output in parallel with the overlapping regions of the segment commands deleted, as soon as the generation of the segment commands is started, as illustrated in FIG. 33. FIG. 33 is a timing chart illustrating the timing of execution of the segment machining programs by the parallel computation unit 220 illustrated in FIG. 32 and the timing of generation of the series of tool travel commands by the command-value generation unit 230 illustrated in FIG. 32 in the second embodiment.

A description is made as to, by way of example, a case in which processing subsequent to outputting of the command-value generation unit 230 is only processing of the machining simulation unit 250. Any sequence of the tool travel commands is acceptable to the machining simulation unit 250. In other words, performing the machining simulation on the segment commands in another sequence, which are generated by the parallel computation unit 220, will yield the same final machining simulation result. In this case, the command-value generation unit 230 outputs the segment commands in parallel, instead of arranging the segment commands in the sequence of segmentation, and the subsequent process, i.e., the machining simulations are performed in parallel, which leads to improved computation efficiency.

The servo simulation unit 240 simulates on the computer a behavior of the machine tool (not illustrated) that is a control target. Specifically, the servo simulation unit 240 presets parameters of inertia, viscosity, and elasticity of the machine tool, parameters of resonance frequency or anti-resonant frequency resulting from the inertia, viscosity, and elasticity, and backlash or lost motion caused by shaft reversal, a parameter of a thermal displacement, and a parameter of the amount of displacement resulting from a reaction force during the machining, and configures a servo model for simulating the behavior of the control target. The servo simulation unit 240 generates a servo response, which is an actual operation of the machine tool, from the tool travel commands by using the constructed servo model and outputs the generated servo response to the machining simulation unit 250. A path and speed waveform of the servo response may be presented on the display, which is the output device.

On the basis of the servo response generated by the servo simulation unit 240, the machining simulation unit 250 simulates a machined shape of a workpiece that will be obtained when the tool of the machine tool operates. The machining simulation unit 250 then outputs a machining simulation result to the output device. That is, the machining simulation unit 250 presents the machining simulation result on the display. The command-value generation apparatus 200 includes the servo simulation unit 240, and the machining simulation unit 250 performs the machining simulation on the basis of a servo response in the second embodiment; alternatively, the servo simulation unit 240 may be eliminated and the machining simulation may be performed on the basis of tool travel commands or segment commands.

The machining simulation unit 250 computes a swept volume, which is a volume of operation of a tool along a servo response. By removing a portion of a workpiece traversed by the swept volume, a final machining result of the workpiece can be simulated.

Performing the processing described in the second embodiment enables the servo simulation or machining simulation based on tool travel commands to be performed swiftly. This enables the simulation, which requires a time equivalent to the actual machining time for a system using one arithmetic unit, to be performed in a short time, thereby achieving a reduction in man-hour required for parameter adjustment that is an adjustment task for a machine tool. When, in particular, any sequence of the tool travel commands is acceptable for the machining simulation, a time lag is not likely to occur between the completion of generation of segment commands by the parallel computation unit 220 and the completion of generation of tool travel commands. Thus, tool travel commands can be generated in a time that is "1/the number of arithmetic units installed", as compared to the time taken when the tool travel commands are generated by using one arithmetic unit.

Third Embodiment

Figure 34:
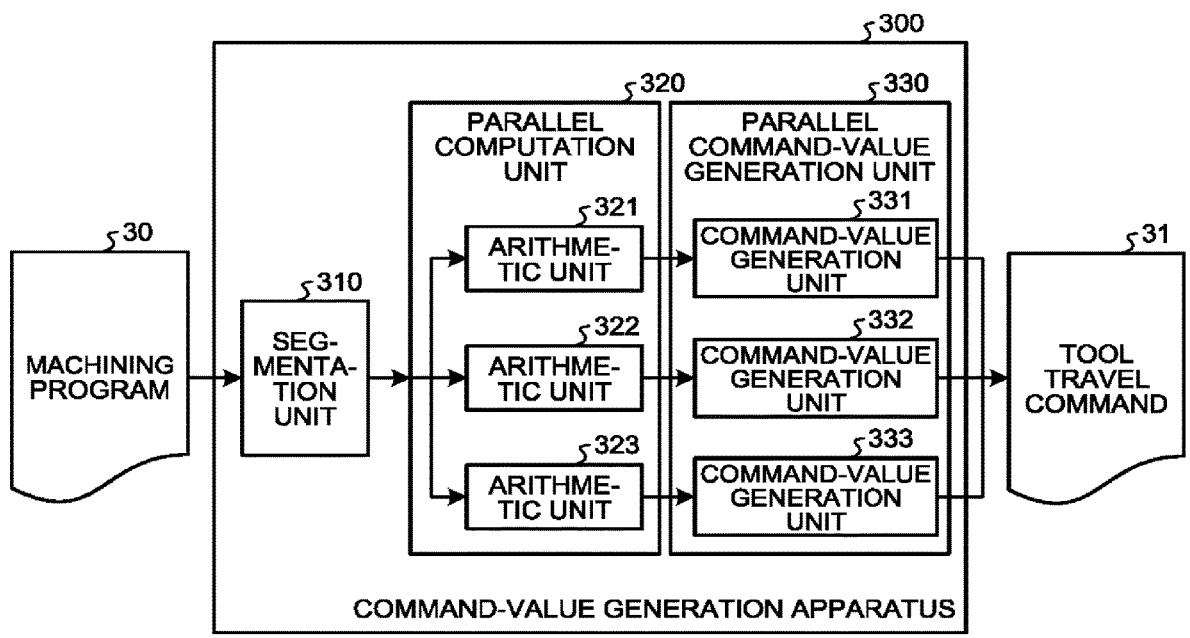
FIG. 34 is a diagram illustrating a configuration of a command-value generation apparatus according to a third embodiment.

FIG. 34 is a diagram illustrating a configuration of a command-value generation apparatus according to a third embodiment of the present invention. A command-value generation apparatus 300 illustrated in FIG. 34 can generate command values swiftly as with the command-value generation apparatus 100 illustrated in FIG. 1, and the command-value generation apparatus 300 illustrated in FIG. 34 differs from the command-value generation apparatus 100 illustrated in FIG. 1 in two points as discussed hereinafter. A first point is that the command-value generation apparatus 300 includes, in place of the command-value generation unit 130, a parallel command-value generation unit 330 that includes a command-value generation unit for each of the arithmetic units and performs a command-value generation processing in parallel. The parallel command-value generation unit 330 includes command-value generation units 331, 332, and 333. The description of the first and second embodiments should be referenced for constituent elements in the third embodiment similar to those in the first and second embodiments; redundant description is omitted in the third embodiment.

Figure 35:
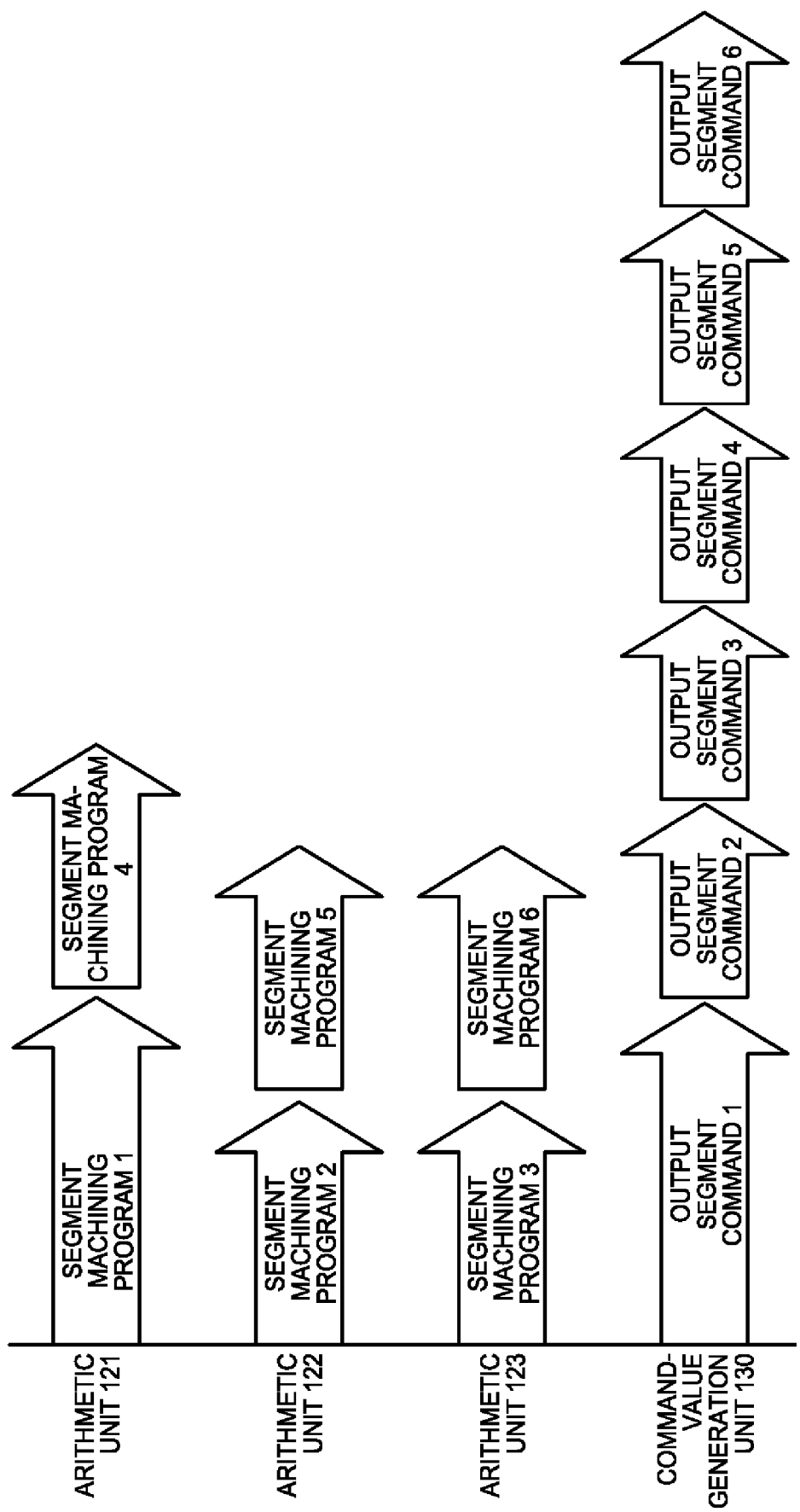
FIG. 35 is a timing chart illustrating the timing of execution of the segment machining programs by the arithmetic units illustrated in FIG. 1 and the timing of generation of the series of tool travel commands by the command-value generation unit illustrated in FIG. 1 in the first embodiment.
Figure 36:
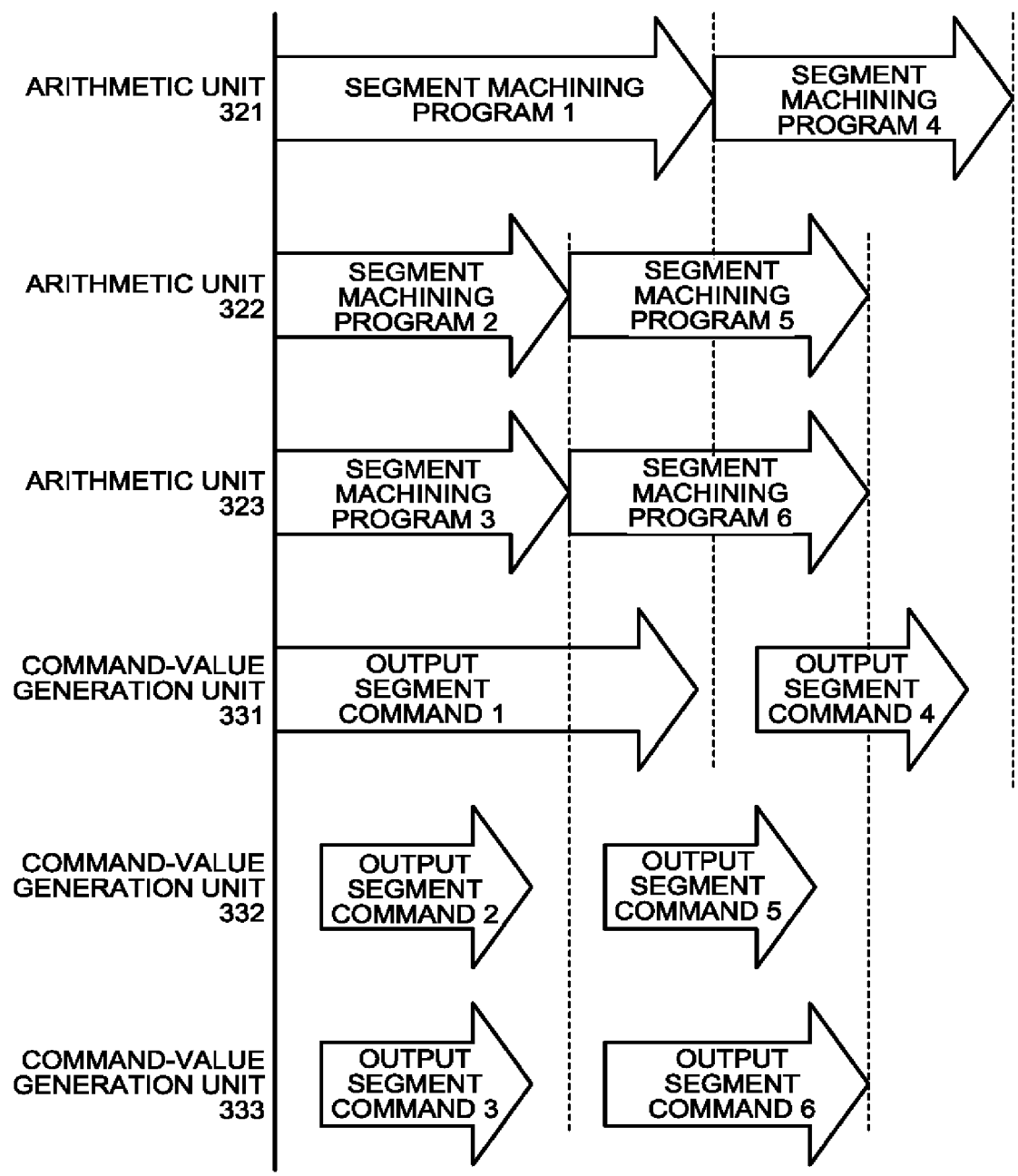
FIG. 36 is a timing chart illustrating the timing of execution of the segment machining programs by arithmetic units illustrated in FIG. 34 and the timing of generation of a series of tool travel commands by command-value generation units illustrated in FIG. 34 in the third embodiment.

FIG. 35 is a timing chart illustrating the timing of execution of the segment machining programs by the arithmetic units 121, 122, and 123 illustrated in FIG. 1 and the timing of generation of the series of tool travel commands by the command-value generation unit 130 illustrated in FIG. 1 in the first embodiment. FIG. 36 is a timing chart illustrating the timing of execution of the segment machining programs by the arithmetic units 321, 322, and 323 illustrated in FIG. 34 and the timing of generation of the series of tool travel commands by the command-value generation units 331, 332, and 333 illustrated in FIG. 34 in the third embodiment. The timing charts illustrated in FIGS. 35 and 36 have a variation in computation time of the arithmetic units, and FIG. 35 is presented for comparison.

In FIG. 35, as soon as completing the processing, the arithmetic units 121, 122, and 123 output the segment commands 1, 2, 3, 4, 5, and 6 to the command-value generation unit 130. The command-value generation unit 130 processes the input segment commands in the order of the segment command 1, the segment command 2, the segment command 3, the segment command 4, the segment command 5, and then the segment command 6; thus, if the computation time of the arithmetic unit 121 varies from that of the arithmetic units 122 and 123, the command-value generation unit 130 cannot start processing the segment commands 2 and 3 until the arithmetic unit 121 completes the processing despite the fact that the computation of the arithmetic units 122 and 123 has been completed. The same goes for the processing performed on the segment commands 4, 5, and 6: the command-value generation unit 130 cannot start processing the segment commands 5 and 6 until the processing on the segment command 4 is completed. As a result, generation of the tool travel commands is delayed; thus, the entire processing speed of the command-value generation apparatus 100 is reduced due to the variation in computation time of the arithmetic units.

For the command-value generation apparatus 300 illustrated in FIG. 34, in contrast, the arithmetic units can perform the command-value generation processing independently: the command-value generation units 332, and 333 can start processing the segment commands 2 and 3 once the arithmetic units 322 and 323 complete the processing even if the arithmetic unit 321 does not complete processing on the segment command 1.

Use of the configuration illustrated in FIG. 34 reduces the likelihood that a time lag is caused between the completion of generation of the segment commands and the completion of generation of the tool travel commands even if there is a variation in computation time of the arithmetic units of the parallel computation unit 320, thus decreasing a speed reduction due to a variation in computation time of the arithmetic units.

A second point is that when each of the arithmetic units is partway through the processing, a partial segment generated so far is output; in other words, each of the arithmetic units outputs a segment command in small units over multiple times.

Use of the configuration illustrated in FIG. 34 enables the parallel command-value generation unit 330, the NC machine tool (not illustrated), or the machining simulation to perform the processing simultaneously with and in parallel with the processing performed by the parallel computation unit 320. This configuration is thus optimal when importance is placed on real-time processing or when it is desired that the NC machine tool or the machining simulation be performed further swiftly.

The command-value generation apparatus 300 illustrated in FIG. 34 includes a segmentation unit 310, the parallel computation unit 320, and the parallel command-value generation unit 330 and numerically controls travel of the tool of the NC machine tool with respect to a workpiece by outputting, in accordance with an input machining program 30, a tool travel command 31 that is a group of interpolation points each located per unit time on a tool path. The segmentation unit 310 segments the machining program 30 into execution units to generate segment machining programs. The parallel computation unit 320 generates the segment commands, which are tool travel commands for the respective execution units, in accordance with machining programs for the respective execution units. The parallel command-value generation unit 330 generates the tool travel commands from the segment commands.

The parallel computation unit 320 includes the arithmetic units 321, 322, and 323. The parallel command-value generation unit 330 includes the command-value generation units 331, 332, and 333. The parallel computation unit 320 and the parallel command-value generation unit 330 are each configured by using a multi-core CPU, a personal computer that includes a plurality of CPUs, or a server or cloud system that is connected to a communication line. While the parallel computation unit 320 includes three arithmetic units in FIG. 34, this is not a limitation in the present invention; it is only required that the parallel computation unit 320 includes at least one arithmetic unit. The number of command-value generation units of the parallel command-value generation unit 330 should be equal to the number of arithmetic units of the parallel computation unit 320. A greater number of arithmetic units of the parallel computation unit 320 increases the speed with which the tool travel commands are generated; thus, the number of arithmetic units may be determined in accordance with a target value for speed enhancement.

A description is made next as to processing by each of the constituent elements. Processing performed by the segmentation unit 310 is the same as that performed by the segmentation unit 110 illustrated in FIG. 1, and thus the description is omitted. The processing performed by the parallel computation unit 320 is similar to that in the first embodiment; the parallel computation unit 320 performs in parallel the same processing as a numerical control apparatus does and generates the segment commands, which are command paths for the tool, from the segment machining programs. In the third embodiment, when each of the arithmetic units is partway through the processing, the arithmetic unit can output the partial segment command generated so far. In other words, the arithmetic unit outputs the segment command in small units over multiple times. The unit smaller than the segment command is referred to as "the number of output units". "The number of output units" can be set as appropriate.

Figure 37:
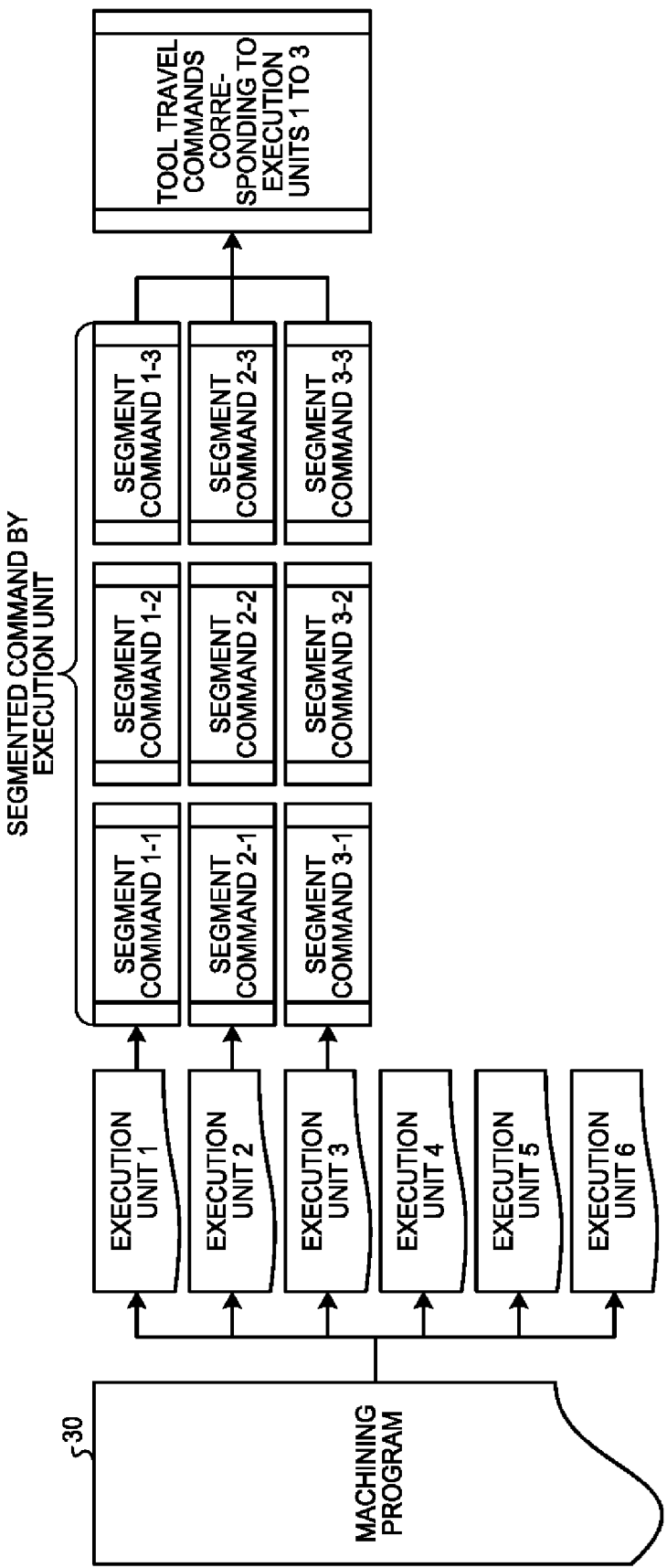
FIG. 37 is a first diagram illustrating a data flow in the command-value generation apparatus illustrated in FIG. 34 in the third embodiment.

Assume that the number of segments N is six and that "the number of output units" is set such that each segment command is divided into three equal parts. FIG. 37 is a first diagram illustrating a data flow in the command-value generation apparatus 300 illustrated in FIG. 34 in the third embodiment. FIG. 38 is a second diagram illustrating a data flow in the command-value generation apparatus 300 illustrated in FIG. 34 in the third embodiment. FIG. 37 illustrates a data flow exhibited during the initial execution by the parallel computation unit 320; FIG. 38 illustrates a data flow exhibited when a machining program for a subsequent one of the execution units is executed after the initial execution is completed by the parallel computation unit 320.

While the segmentation unit 310 segments the machining program 30 into six execution units: execution unit 1; execution unit 2; execution unit 3; execution unit 4; execution unit 5; and execution unit 6, and each segment command per execution unit is divided into three equal smaller parts in FIGS. 37 and 38, this is not a limitation in the present invention; the number of segments and "the number of output units" can be set as appropriate.

When the segmentation unit 310 segments the machining program 30 into execution units 1, 2, 3, 4, 5, and 6, the parallel computation unit 320, which includes three arithmetic units, executes execution units 1, 2, and 3 in parallel and generates segment commands 1-1, 1-2, and 1-3, segment commands 2-1, 2-2, and 2-3, and segment commands 3-1, 3-2, and 3-3 as illustrated in FIG. 37. The parallel command-value generation unit 330 then generates tool travel commands that correspond to execution units 1 to 3, from the segment commands 1-1, 1-2, and 1-3, the segment commands 2-1, 2-2, and 2-3, and the segment commands 3-1, 3-2, and 3-3.

The same processing as a numerical control apparatus is performed, such that the segment commands 1-1, 2-1, and 3-1, which are a set of groups of interpolation points each provided per unit time, are generated. Specific examples of the processing can include acceleration/deceleration processing that generates a speed waveform for acceleration/deceleration at a predefined acceleration, smoothing processing that smooths the speed waveform generated by the acceleration/deceleration processing, and interpolation processing that computes an interpolation point, which is a tool position per unit time as the tool travels at a post-smoothing-processing speed. At the same time, the number of interpolation points for the segment commands 1-1, 2-1, and 3-1 is calculated.

Then, it is determined whether "the number of output units" is reached and whether an overlapping region is included for each of the segment commands 1-1, 2-1, and 3-1. The determination method differs depending on whether an overlapping region is included at a start portion of each of the segment commands 1-1, 2-1, and 3-1 or whether an overlapping region is included at an end portion thereof.

Whether an overlapping region is included at the start portion can be determined based on a result of comparison between a cumulative distance exhibited when the segment command is output and the overlap quantity. When the result shows that the former is larger, it is determined that the segment command does not include an overlapping region; when the result shows that the latter is larger, it is determined that the segment command includes an overlapping region.

Then, whether an overlapping region is included at the end portion can be determined based on a result of comparison between a remaining distance exhibited when the segment command is output and the overlap quantity. When the result shows that the former is larger, it is determined that the segment command does not include an overlapping region; when the result shows that the latter is larger, it is determined that the segment command includes an overlapping region.

When the condition described above is satisfied, each of the segment commands 1-1, 2-1, and 3-1 is output to the parallel command-value generation unit 330. The segment commands 1-1, 2-1, and 3-1 are stored in the parallel computation unit 320 until the condition described above is satisfied; in the meantime, the segment commands 1-2, 2-2, and 3-2 are generated successively.

At the same time, the number of interpolation points for each of the segment commands 1-2, 2-2, and 3-2 is calculated, and it is determined again whether "the number of output units" is reached and whether overlapping regions are included for each of the segment commands 1-1, 2-1, and 3-1; then, each of the segment commands 1-2, 2-2, and 3-2 is output to the parallel command-value generation unit 330. This task is performed until the segment commands 1-3, 2-3, and 3-3 are output to the parallel command-value generation unit 330, and tool travel commands that correspond to execution units 1 to 3 are generated.

Upon completing executing execution units 1 to 3, the parallel computation unit 320 executes execution units 4 to 6, which are the subsequent execution units, and generates segment commands 4-1, 4-2, and 4-3, segment commands 5-1, 5-2, and 5-3, and segment commands 6-1, 6-2, and 6-3 as illustrated in FIG. 38.

A description is made next as to processing performed by the parallel command-value generation unit 330, which includes the command-value generation units in the same number as the arithmetic units of the parallel computation unit 320. Processing by the parallel command-value generation unit 330 is also similar to that by the command-value generation unit 130 illustrated in FIG. 1. That is, the segment commands are output with respective overlapping regions removed, such that the tool travel commands are generated.

A segment command determined by the parallel computation unit 320 as including no overlapping region is output as it is. The processing described above is performed by each of the command-value generation units, which corresponds to one of the arithmetic units. Since command values can be generated sequentially as the arithmetic units complete generating segment commands, a reduction in speed of the entire command-value generation apparatus can be prohibited even if there is a variation in processing time of the arithmetic units.

As described above, performing the processing described in the third embodiment can minimize the effect of a reduction in speed of the entire command-value generation apparatus, the reduction being caused due to a variation in processing time of each of the arithmetic units. Additionally, a time lag is not likely to be caused between the completion of generation of segment commands by the parallel computation unit 320 and the completion of generation of tool travel commands. The command-value generation apparatus according to the third embodiment is less susceptible to variations in processing time of the arithmetic units than the command-value generation apparatus according to the first embodiment and can generate tool travel commands swiftly. It is necessary to set "the number of output units" when a segment command is output in small units over multiple times by the method described above. "The number of output units", however, can be changed at a timing when a number-of-output-units change request signal is received from the command-value generation unit. Alternatively, it is also possible to output a segment command in small units over multiple times without setting "the number of output units" by outputting the segment command at a timing when an output request signal is received from the command-value generation unit.

The configuration described above in the third embodiment can be also combined with the configuration described in the second embodiment. That is, a command-value generation apparatus that includes the parallel command-value generation unit as described in the third embodiment may include the servo simulation unit and the machining simulation unit described in the second embodiment.

The configurations in the embodiments described above represent some examples of the present invention, and they can be combined with another publicly known technique and partially omitted or modified without departing from the spirit of the present invention.

REFERENCE SIGNS LIST 10, 20, 30 machining program; 11, 31 tool travel command; 100, 200, 300 command-value generation apparatus; 110, 210, 310 segmentation unit; 120, 220, 320 parallel computation unit; 121, 122, 123, 221, 222, 223, 321, 322, 323 arithmetic unit; 130, 230, 331, 332, 333 command-value generation unit; 240 servo simulation unit; 250 machining simulation unit; 330 parallel command-value generation unit.

The invention claimed is:

1. A command-value generation apparatus to calculate a tool path in accordance with a machining program, and generate a tool travel command that is a group of interpolation points each located per unit time on the tool path, the command-value generation apparatus comprising:
a divider to segment the machining program into execution units to generate segment machining programs;
a parallel computer, including a plurality of arithmetic operators, to execute the segment machining programs in parallel based on the execution units and generate a segment command for each of the execution units, the segment command being the group of interpolation points on the tool path; and
a command-value generator to generate the tool travel command from the segment command for each of the execution units, wherein
when a first direction from a start of the machining program toward an end of the machining program is defined as a rearward direction and a second direction from the end of the machining program toward the start of the machining program is defined as a forward direction,
the segment machining programs are separate from one another by at least one segmentation point, the segment machining programs include a forward segment machining program located forward of the segmentation point, and a rearward segment machining program located rearward of the segmentation point, the forward segment machining program having an end portion, the rearward segment machining program having a start portion,
the divider (1) calculates, based on a preset acceleration A, an acceleration distance by which a tool travels until the tool reaches a command speed F, and (2) calculates, based on the acceleration distance, an overlap quantity Lo at the segmentation point, the overlap quantity Lo being a distance by which the tool travels the acceleration distance and then travels at the command speed F for a travel average smoothing time Ts,
the divider calculates the overlap quantity Lo based on the following formula:

$$Lo = \frac{F}{2}\left(\frac{F}{A} + 2Ts\right),$$

and
the divider causes the start portion of the rearward segment machining program and the end portion of the forward segment machining program to overlap each other by the overlap quantity Lo.

2. The command-value generation apparatus according to claim wherein the command-value generator deletes an overlapping portion from the segment command for each of the execution units.

3. The command-value generation apparatus according to claim 1, wherein the divider segments the machining program into the execution units such that number of the execution units are equal to or greater than number of the arithmetic operators in the parallel computer.

4. The command-value generation apparatus according to claim 1, wherein the divider causes a computation time of the segment command for each of the execution units or a path length of the machining program for each of the execution units to be equal.

5. The command-value generation apparatus according to claim 1, further comprising a machining simulator to simulate a machined shape of a workpiece on a basis of the tool travel cormrand.

6. The command-value generation apparatus according to claim 1, further comprising a servo simulator to estimate a servo response from the tool travel command on a basis of a preset servo model.

7. The command-value generation apparatus according to claim 1, wherein the parallel computer is configured by using a multi-core CPU, a personal computer that includes a plurality of CPUs, or a server or cloud system that is connected to a communication line.

8. The command-value generation apparatus according to claim 1, wherein to correct spacing, between interpolation points of the group of interpolation points, that occurs at a first location of changeover of the segment command, the command-value generator adjusts a second location of one of the interpolation points on a path of the segment command.

9. The command-value generation apparatus according to claim 1, wherein the command-value generator deletes overlapping portions in parallel from the segment commands based on the execution units.

10. The command value generation apparatus according to claim 1, wherein the parallel computer outputs the segment command in small units over multiple times.

11. A command-value generation apparatus to calculate a tool path in accordance with a machining program, and generate a tool travel command that is a group of interpolation points each located per unit time on the tool path, the command-value generation apparatus comprising:
a divider to segment the machining program into execution units to generate segment machining programs; and a command-value generator to generate the tool travel command from the segment command for each of the execution units, wherein the segment machining programs are separate from one another by at least one segmentation point, the segment machining programs include a forward segment machining program located forward of the segmentation point, and a rearward segment machining program located rearward of the segmentation point, the forward segment machining program having an end portion, the rearward segment machining program having a start portion, the divider (1) calculates, based on a preset acceleration A, an acceleration distance by which a tool travels until the tool reaches a command speed F, and (2) calculates, based on the acceleration distance, an overlap quantity Lo at the segmentation point, the overlap quantity Lo being a distance by which the tool travels the acceleration distance and then travels at the command speed F for a travel average smoothing time Ts, the divider calculates the overlap quantity Lo based on the following formula:

$$Lo = \frac{F}{2}\left(\frac{F}{A} + 2Ts\right),$$

and the divider causes the start portion of the rearward segment machining program and the end portion of the forward segment machining program to overlap each other by the overlap quantity Lo.

* * * * *